US010127887B2

(12) United States Patent
Taylor et al.

(10) Patent No.: US 10,127,887 B2
(45) Date of Patent: Nov. 13, 2018

(54) ACCELERATION OF COLOR CONVERSION

(71) Applicant: Intel Corporation, Santa Clara, CA (US)

(72) Inventors: Stewart N. Taylor, Los Altos, CA (US); Yuenian Yang, Folsom, CA (US); Ryan Metcalfe, Webster, NY (US)

(73) Assignee: Intel Corporation, Santa Clara, CA (US)

( * ) Notice: Subject to any disclaimer, the term of this patent is extended or adjusted under 35 U.S.C. 154(b) by 207 days.

(21) Appl. No.: 14/597,059

(22) Filed: Jan. 14, 2015

(65) Prior Publication Data

US 2016/0203790 A1 Jul. 14, 2016

(51) Int. Cl.
*G06K 9/00* (2006.01)
*G09G 5/06* (2006.01)
*G09G 5/36* (2006.01)

(52) U.S. Cl.
CPC ............... *G09G 5/06* (2013.01); *G09G 5/363* (2013.01); *G09G 2340/06* (2013.01)

(58) Field of Classification Search
None
See application file for complete search history.

(56) References Cited

U.S. PATENT DOCUMENTS 6,295,137 B1 * 9/2001 Balasubramanian ........................ H04N 1/6019 358/1.9
6,674,430 B1 * 1/2004 Kaufman .............. G06T 15/005 345/419
7,940,393 B2 * 5/2011 Noy ..................... H04N 1/6033 356/243.5
7,940,434 B2 * 5/2011 Inoue ................... H04N 1/6019 345/591
8,300,933 B2 * 10/2012 Wu .......................... H04N 1/60 382/167
2002/0067848 A1 * 6/2002 Queiroz ............... H04N 1/6016 382/162
2011/0169856 A1 * 7/2011 Park ..................... G09G 3/3607 345/589
2012/0121167 A1 * 5/2012 Atoyan ................. G06F 17/147 382/154
2012/0188229 A1 * 7/2012 Wan ....................... H04N 1/407 345/419
2014/0098387 A1 * 4/2014 Chang .................. H04N 1/6058 358/1.9

(Continued)

OTHER PUBLICATIONS

Mongeon et al, Image Transformation Into Device Dependent Color Printer Description Using 4thOrder Polynomial Regression and Object Oriented Programming Development of Image Processing Modules, Electronic Imaging: Science & Technology, 1996.*

(Continued)

*Primary Examiner* — Andrae S Allison
(74) *Attorney, Agent, or Firm* — Green, Howard & Mughal LLP

(57) ABSTRACT

Techniques related to accelerating color conversion are discussed. Such techniques may include generating a converted color value based on an array of ordered coefficients associated with a subsection of a section of a color conversion space and input color channel value offsets within the section of the color conversion space.

23 Claims, 9 Drawing Sheets

(56) References Cited

U.S. PATENT DOCUMENTS

2014/0118387 A1* 5/2014 Kim .......................... H04N 9/67
345/590
2015/0172616 A1* 6/2015 Ye ............................ H04N 1/64
348/43

OTHER PUBLICATIONS

Sun et al, Study on the 3D Interpolation Models Used in Color Conversion, IACSIT International Journal of Engineering and Technology, vol. 4, No. 1, Feb. 2012.*
Bangyong, Sun et al., "Study on the 3D Interpolation Models Used in Color Conversion" IACSIT International Journal of Engineering and Technology, vol. 4, No. 1, Feb. 2012, 4 pages.

* cited by examiner

302

| | |
|---|---|
| $T_1$ | $P_{000}, P_{100}, P_{110}, P_{111}$ |
| $T_2$ | $P_{000}, P_{100}, P_{101}, P_{111}$ |
| $T_3$ | $P_{000}, P_{001}, P_{101}, P_{111}$ |
| $T_4$ | $P_{000}, P_{010}, P_{110}, P_{111}$ |
| $T_5$ | $P_{000}, P_{010}, P_{011}, P_{111}$ |
| $T_6$ | $P_{000}, P_{001}, P_{011}, P_{111}$ |

ACCELERATION OF COLOR CONVERSION

BACKGROUND

In color images, pixel values may be represented by three or more values or channels. Such values may be interpreted according to an associated color space to display the pixel values, process them, or the like. Examples of such color spaces include the RGB (red, green, blue) color space, the YUV (Y luminance, U chroma, and V chroma) color space, the YCbCr (luminance, blue difference, and red difference) color space, and the CMYK (cyan, magenta, yellow, key or black) color space. Conversion between such color spaces may be performed via matrix multiplication, lookup tables (LUTs), or a combination thereof.

For example, in high quality image processing, color LUTs may be more commonly used for such color conversions. Such LUTs may include a sparse n-dimensional array (e.g., a 3D array) and the final color channel values may be determined based on retrieved LUT values and subsequent interpolation. For example, the input to the LUT may include three channels of 256-level (e.g., 8 bit) colors and the LUT may only be a 16×16×16 LUT such that each output color channel may be determined by looking up the closest points in the LUT (e.g., indices of a box within which the color value lies) and interpolating between them to find the conversion value. In some examples, such conversion may include tetrahedral interpolation or another form of interpolation. For example, the box or cube (in 3D) within which the color value lies may be divided into tetrahedrons and interpolation may be performed differently depending on which tetrahedron the color value is within. Such a process may be repeated for each output color channel (e.g., three times for conversion to a three channel color space or four times for conversion to a four channel color space or the like).

However, it may be advantageous to perform such color conversions more quickly and with less computational requirements. It is with respect to these and other considerations that the present improvements have been needed. Such improvements may become critical as the desire to process image data becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
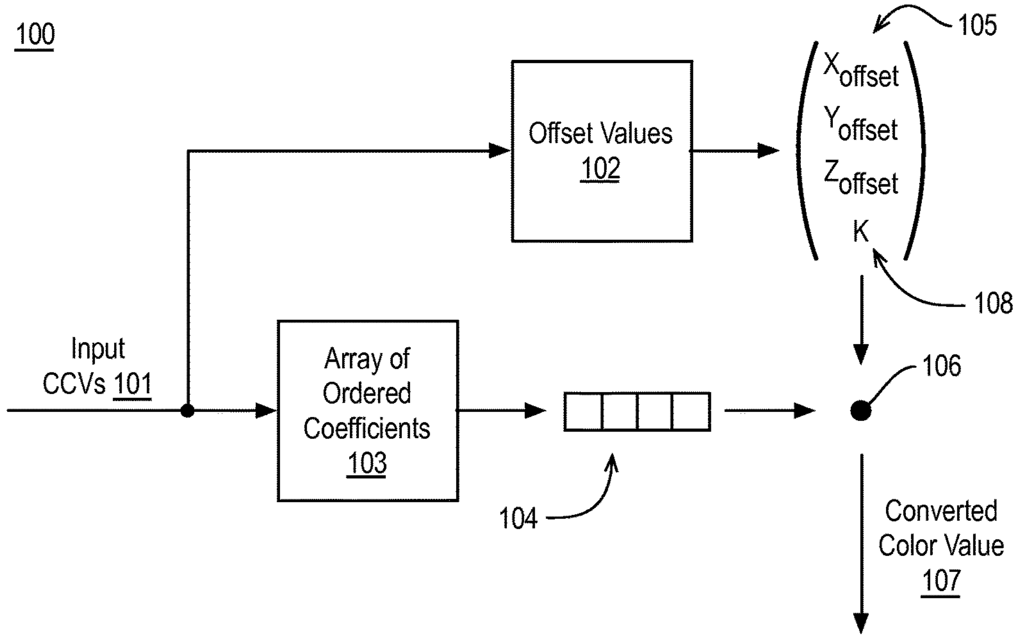
FIG. 1 illustrates an example device for performing color conversion.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices anchor consumer electronic (CE) devices such as multi-function devices, tablets, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to color conversion and, in particular, to providing accelerated color conversion via recalculated arrays of ordered coefficients.

As described above, in image processing, color conversion or conversion between color spaces may convert color channel values for pixels of an image in a color space to color channel values in a different color space (or in a converted version of the same color space). It may be advantageous to perform such color conversions quickly and with less computational resources.

In some embodiments discussed herein, performing a color conversion may include determining an array of ordered coefficients based on input color channel values associated with a pixel of an input image. For example, the input color channel values may be in a first color space (e.g., RGB, YUV, YCbCr, CMYK, etc.). The array of ordered coefficients may be predetermined and, in some examples, implemented via a look up table. The array of ordered coefficients for particular color channel values may be based on (e.g., the look up table may be indexed by) the color channel values and, in particular, a determination as to which subsection of a section within a color conversion space the color channel values are within. Furthermore, offset values may be determined or generated for the input color channel values. For example, the offset values may be the offset of the input color channel values within the section of the color conversion space the color channel values are within (e.g., a difference between the input color channel values and origin values of the section). For example, if a 3D color conversion space is divided into multiple cubes, the offset values for input color channel values may be the offset of the input color channel values within the cube in which it lies.

Based on the offset values and the array of ordered coefficients for the input color channel values, a converted color value for an output color channel may be generated. For example, the converted color value may be generated via a dot product of the array of ordered coefficients and the offset values (and in some examples, a dot product of the array of ordered coefficients and an array including the offset values and a constant such as 1). For example, the array of ordered coefficients may have been predetermined as the linear coefficients that, when multiplied with the offset values (and a constant) and then added, provide the desired converted color value. Such a process may be repeated for the other output color channels as needed to provide output color channel values for the pixel of the input image (e.g., output color channels for an output image based on the input image). In some examples, the dot product or a similar computation may be efficiently provided via a single instruction multiple data operation and the discussed techniques may provide faster color conversion and/or color conversion using reduced computational resources.

FIG. 1 illustrates an example device 100 for performing color conversion, arranged in accordance with at least some implementations of the present disclosure. As shown in FIG. 1, device 100 may include an array of ordered coefficients module 103 and an offset values module 102. Device 100 may also include a color conversion operation module 106, which in the example of FIG. 1 is illustrated as performing a dot product, as is discussed further herein. Device 100 may be any suitable form factor device such as a computer, a laptop computer, a tablet, a smart phone, a multifunction device, a gaming console, a display device, or the like. For example, device 100 may perform color conversion as discussed herein.

As shown, array of ordered coefficients module 103 and offset values module 102 may receive input color channel values 101. Input color channel values 101 may be associated with a pixel or pixels of an image or image frame of a video or the like. For example, an image frame or a video frame or the like may include an array of pixels with each pixel having multiple values associated therewith such that each of the values are associated with a particular color channel. For example, for an image frame or the like in the RGB color space, each pixel of the image frame may have a value associated therewith for R, a value for G, and a value for B (e.g., a value for each of the R channel, the G channel, and the B channel). As used herein, input color channel values 101 may include a value for each such color channel for a pixel or pixels of an input image. For example, generalizing to a 3D color space, input color channel values 101 may include an X value, a Y value, and a Z value associated with a particular pixel of an input image. However, input color channel values 101 may include any number of color channel values such as four (for a 4D input color space) or the like (e.g., an n-D input color space).

Input color channel values 101 may be in any suitable color space such as the RGB (red, green, blue) color space, the YUV (Y luminance, U chroma, and V chroma) color space, the YCbCr (luminance, blue difference, and red difference) color space, the CMYK (cyan, magenta, yellow, key or black) color space, or the like. Furthermore, input color channel values 101 may include values for any number of pixels for any type of input image. For example, the input image may include a static image, an image frame of a video, a graphics frame, portions thereof, or the like.

As shown in FIG. 1, array of ordered coefficients module 103 may receive input color channel values 101 and array of ordered coefficients module 103 may generate array of ordered coefficients 104 based on input color channel values 101. For example, array of ordered coefficients 104 may be based on input color channel values 101 such that input color channel values 101 are associated with a pixel of an input image. Array of ordered coefficients module 103 may generate array of ordered coefficients 104 using any suitable technique or techniques. In some examples, array of ordered coefficients module 103 may generate array of ordered coefficients 104 via accessing a look up table as is discussed further herein. As used herein, an array of ordered coefficients may be coefficients that provide coefficients for a linear equation based on offset values such that the linear equation provides a converted color value based on the offset values and the array of ordered coefficients. In some examples, array of ordered coefficients 104 may be associated with a subsection within a section of a conversion color space as is discussed further herein.

As also shown in FIG. 1, offset values module 102 may generate offset values 105 based on input color channel values 101. For example, offset values 105 may be based on input color channel values 101 and a section of a color conversion space within which the input color channel values lie. In some examples, offset values 105 may include an offset value for each input color channel of input color channel values 101 as a difference between input color channel values 101 and origin values of the section of the conversion color space that input color channel values 101 are within. For example, the origin values of a section may be the vertex values of the section for the vertex closest to the origin of the color conversion space. As shown, offset values 105 may include $X_{offset}$, $Y_{offset}$, and $Z_{offset}$ for examples where input color channel values 101 include a 3D color space. However, offset values 105 may include any number of offset values such as three or four or N or the like. Also as shown, in some examples, offset values 105 may include or be concatenated with a constant (K) 108 such as a constant having a value of 1.

Array of ordered coefficients 104 and offset values 105 and constant 108) may be received via color conversion operation module 106. Color conversion operation module 106 may generate converted color value 107 based on array of ordered coefficients 104 and offset values 105 (and constant 108). For example, color conversion operation module 106 may perform a dot product on array of ordered coefficients 104 and offset values 105 (and constant 108) to generate converted color value as shown in Equation (1):

$$CCV=C_1\times X_{offset}+C_2\times Y_{offset}+C_3\times Z_{offset}+C_4\times K \quad (1)$$

where CCV may be the converted color value (e.g., converted color value 107), $C_1$ may be the first coefficient in array of ordered coefficients 104, $X_{offset}$ may be a first color channel offset, $C_2$ may be the second coefficient in array of ordered coefficients 104, $Y_{offset}$ may be a second color channel offset, $C_3$ may be the third coefficient in array of ordered coefficients 104, $Z_{offset}$ may be a third color channel offset, $C_4$ may be the fourth coefficient in array of ordered coefficients 104, and K may be the constant (e.g., constant 108). As shown, Equation (1) may include four added terms (e.g., $C_1\times X_{offset}$, $C_2\times Y_{offset}$, $C_3\times Z_{offset}$, and $C_4\times K$) associated with a 3D input color space and 1 constant. However, Equation (1) (and offset values 105 and array of coefficients) may include any number of added terms based on the dimension of the input color space. For example, a 4D input color space may provide four offset values 105 and an array of ordered coefficients having four coefficients (if no constant 108 is implemented) or five coefficients (if constant 108 is implemented). For a n-D input color space n offset values 105 and an array of ordered coefficients having n coefficients (if no constant 108 is implemented) or n+1 coefficients (if constant 108 is implemented).

Converted color value 107 may be a color value for any output color channel in any suitable color space. For example, conversion may be performed to generate color channel values in the RGB color space, the YUV color space, the YCbCr color space, the CMYK color space, or the like. In some examples, color conversion may be performed from one color space to a different color space and, in other examples, color conversion may be performed from one color space to the same color space. Furthermore, the discussed operations implemented via array of ordered coefficients module 103, offset values module 102, and color conversion operation module 106 may provide for a single color channel value in the converted color space. Such operations may be repeated to generate other color channel values in the converted color space. For example, such operations may be repeated three times (e.g., with different arrays of ordered coefficients) to generate three color channels in a converted color space having three color channels or four times to generate four color channels in a converted color space having four color channels or the like.

Device 100 may be implemented to generate converted color value 107 (e.g., a color value for a particular color channel for a pixel of an input image) based on input color channel values 101 (e.g., color channel values for the pixel of the input image). Such operations may be performed as associated with a color conversion space divided into sections, which are in turn divided into subsections.

Figure 2:
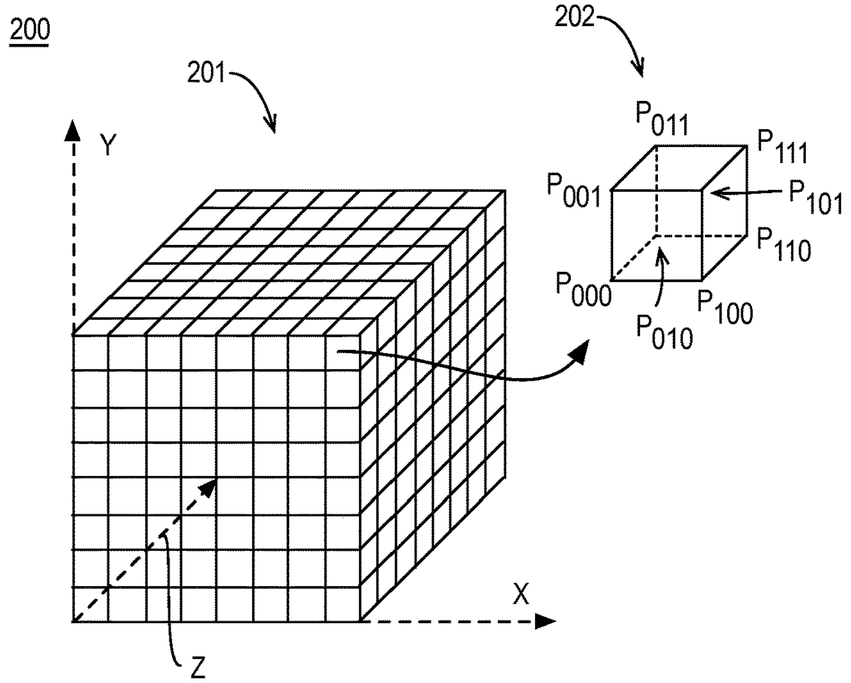
FIG. 2 illustrates an example 3D color conversion space.

FIG. 2 illustrates an example 3D color conversion space 200, arranged in accordance with at least some implementations of the present disclosure. As shown in FIG. 2, color conversion space 200 may be divided via division pattern 201 to generate multiple sections such as example section 202. As discussed, FIG. 2 illustrates an example 3D color conversion space for the sake of clarity of presentation. However, color conversion space 200 may have any dimensionality such as a 4-dimensions or n-dimensions. Furthermore, FIG. 2 illustrates color conversion space 200 in a generalized space labeled via X, Y, Z. Color conversion space 200 may be in any input color space such as R, G, B or Y, U, V or Y, Cb, Cr (e.g., in 3D) or C, M, Y, K (e.g., in 4D) or the like.

As discussed, color conversion space 200 may be divided via division pattern 201. In the illustrated example, division pattern 201 divides color conversion space 200 into cubic sections. However, division pattern 201 may divides color conversion space 200 into any suitable shaped sections such as rectangular cuboids (or rectangular prisms) or the like. Furthermore, in the example of FIG. 2, division pattern 201 divides color conversion space 200 into 8×8×8 sections (e.g., 512 total sections). However, division pattern 201 may divide color conversion space 200 into any number of sections such as 16×16×16 sections (e.g., 4,096 total sections), which are generalized herein as L×M×N sections.

As discussed, FIG. 2 illustrates an example section 202 of color conversion space 200 as divided via division pattern 201. As shown, section 202 may be a cube and may include vertices $P_{000}$, $P_{001}$, $P_{101}$, $P_{100}$, $P_{011}$, $P_{111}$, $P_{010}$, and $P_{110}$. As used herein, vertices or vertex values or the like may be associated with positions within color conversion space 201 and/or color conversion values (e.g., values for performing a color conversion). For example, vertex $P_{000}$ may be associated with values in color conversion space 200 and values for converting to a converted color conversion space for as color channel. Furthermore, as used herein vertex $P_{000}$ may be an origin vertex for section 202 as vertex $P_{000}$ is closest to the origin of color conversion space 200. For example, offset values for input color channel values may be determined within section 202 with respect to origin vertex $P_{000}$ (e.g., as the difference between the position of the input color channel values and the position of origin vertex $P_{000}$ within color conversion space 200).

Returning to FIG. 1, as discussed with respect to offset values 105, input color channel values 101 (e.g., the color channel values for a pixel) may be associated with a section of a color conversions space. For example, input color channel values 101 may be within a section of color conversion space 200. For example, if input color channel values 101 are each 8-bit values with a range of 0 to 255 (e.g., 256 values), each section of color conversion space 200 as divided by division pattern 201 may include 32 values (e.g., 256/8) in each direction (e.g., 32×32×32). In another example, if color conversion space 200 as divided by a division pattern having 16 sections along each axis, each section may include 16 values in each direction (e.g., 16×16×16). In general, if color conversion space 200 is divided into L×M×N sections and the maximum value along each axis is provided as Xmax, Ymax, Zmax, respectively, each section may include Xmax/L×Ymax/M×Zmax/N values.

Furthermore, the section within which input color conversion values 101 lies may be determined, in general as Xs=X/Xmax*L, Ys=Y/Ymax*L, and Zs=Z/Zmax*L, where Xs, Ys, Zs is the section, X, Y, Z, are the input color conversion values, and Xmax, Ymax, Zmax are the maximum values along each axis as discussed. For example, if input color conversion values 101 are X=250, Y=254, Z=5, the input color conversion values may lie within section 202 (e.g., Xs=250/256*8=7.8, Ys=254/256*8=7.9, Xs=250/256*8=0.15; e.g., section 7, 7, 0 where sections of color conversion space 200 are labeled from 0 to 7 along each axis). As is discussed further herein, in some examples, high bit operations may be used to readily determine the section within which input color conversion values lie, particularly when a color conversion space 200 having maximum values of 256×256×256 is divided into a 16×16×16 sections.

Furthermore, with reference to FIG. 1, as discussed with respect to array of ordered coefficients module 103, array of ordered coefficients 104 may be determined based on a subsection within a section of a conversion color space. For example, sections of color conversion space 200 such as section 202 may be divided into subsections.

Figure 3:
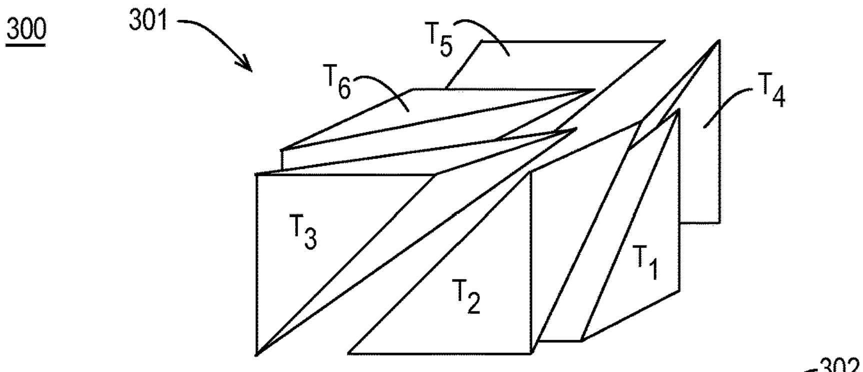
FIG. 3 illustrates an example subsection division of a section into example tetrahedron subsections.
Figure 3:
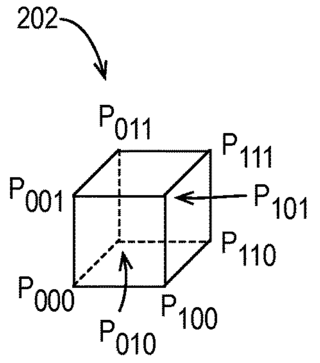

FIG. 3 illustrates an example subsection division 300 of section 202 into example tetrahedron subsections 301, arranged in accordance with at least some implementations of the present disclosure. As shown in FIG. 3, sections of color conversion space 200 (please refer to FIG. 2) such as example section 202 may be divided via subsection division 300 to generate multiple subsections such as example tetrahedron subsections 301 (labeled $T_1$, $T_2$, $T_3$, $T_4$, $T_5$, $T_6$ in FIG. 3). For example, with reference to FIG. 1, array of ordered coefficients module 103 may determine which tetrahedron subsection of a section of a color conversion space input color conversion values 101 are within. Based on the determined subsection, array of ordered coefficients 104 may be provided. For example, such array of ordered coefficients 104 may be predetermined and stored within a look up table or the like such that they may be retrieved based on a subsection indexing (e.g., tetrahedron 1-6 in the example of FIG. 3).

As discussed, FIG. 3 illustrates an example division of section 202 into tetrahedron subsections 301. In the example of FIG. 3, section 202 may be divided into tetrahedron subsections 301 such that $T_1$ includes indices $P_{000}$, $P_{100}$, $P_{110}$, $P_{111}$, $T_2$ includes indices $P_{000}$, $P_{100}$, $P_{101}$, $P_{111}$, $T_3$ includes indices $P_{000}$, $P_{001}$, $P_{101}$, $P_{111}$, $T_4$ includes indices $P_{000}$, $P_{010}$, $P_{110}$, $P_{111}$, $T_5$ includes indices $P_{000}$, $P_{010}$, $P_{011}$, $P_{111}$, and $T_6$ includes indices $P_{000}$, $P_{001}$, $P_{011}$, $P_{111}$ as shown in table 302. However, section 202 (and other sections of color conversion space 200) may be divided into tetrahedron subsections using any suitable configuration. Furthermore, section 202 (and other sections of color conversion space 200) may be divided into any subsection shapes. In some examples, all sections of color conversion space 200 may be divided into the same subsection shapes and, in other examples, sections of color conversion space 200 may be divided into different subsection shapes or different subsection shape configurations.

Figure 4:
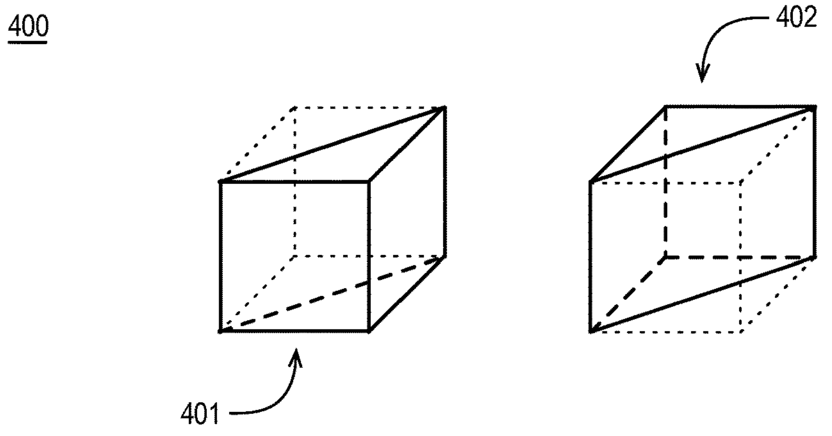
FIG. 4 illustrates an example subsection division of a section into example prism subsections.

FIG. 4 illustrates an example subsection division 400 of section 200 into example prism subsections 401 and 402, arranged in accordance with at least some implementations of the present disclosure. As shown in FIG. 4, sections of color conversion space 200 (please refer to FIG. 2) such as example section 202 may be divided via subsection division 400 to generate prism subsections 401, 402. For example, with reference to FIG. 1, array of ordered coefficients module 103 may determine which prism subsection of a section of a color conversion space input color conversion values 101 lie within and based on the determined subsection, array of ordered coefficients 104 may be provided. For example, such array of ordered coefficients 104 may be predetermined and stored within a look up table or the like such that they may be retrieved based on a subsection indexing (e.g., prism subsections 401, 402 in the example of FIG. 4).

As discussed, FIG. 4 illustrates an example division of section 202 into prism subsections 401, 402. In the example of FIG. 4, section 202 may be divided into prism subsections 401, 402 such that prism subsection 401 includes indices $P_{000}$, $P_{100}$, $P_{001}$, $P_{101}$, $P_{110}$, $P_{111}$ and prism subsection 402 includes indices $P_{000}$, $P_{001}$, $P_{011}$, $P_{111}$, $P_{010}$, $P_{110}$. However, section 202 (and other sections of color conversion space 200) may be divided into prism subsections using any suitable configuration.

Figure 5:
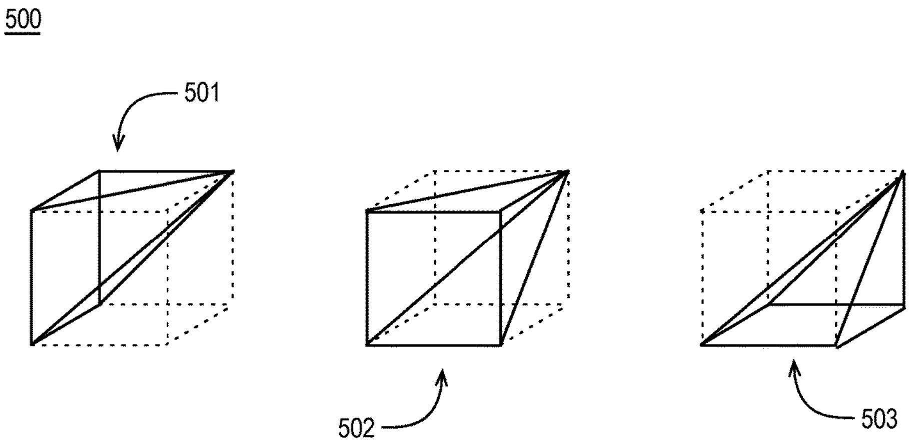
FIG. 5 illustrates an example subsection division of a section into example pyramid subsections.

FIG. 5 illustrates an example subsection division 500 of section 200 into example pyramid subsections 501, 502, and 503, arranged in accordance with at least some implementations of the present disclosure. As shown in FIG. 5, sections of color conversion space 200 (please refer to FIG. 2) such as example section 202 may be divided via subsection division 500 to generate pyramid subsections 501, 502, 503. For example, with reference to FIG. 1, array of ordered coefficients module 103 may determine which pyramid subsection of a section of a color conversion space input color conversion values 101 lie within and based on the determined subsection, array of ordered coefficients 104 may be provided. For example, such array of ordered coefficients 104 may be predetermined and stored within a look up table or the like such that they may be retrieved based on a subsection indexing (e.g., pyramid subsections 501, 502, 503 in the example of FIG. 4).

As discussed, FIG. 4 illustrates an example division of section 202 into pyramid subsections 501, 502, 503. In the example of FIG. 5, section 202 may be divided into pyramid subsections 501, 502, 503 such that pyramid subsection 501 includes indices $P_{000}$, $P_{001}$, $P_{011}$, $P_{010}$, $P_{111}$, pyramid subsection 502 includes indices $P_{000}$, $P_{001}$, $P_{101}$, $P_{100}$, $P_{111}$, and pyramid subsection 503 includes indices $P_{000}$, $P_{100}$, $P_{010}$, $P_{110}$, $P_{111}$. However, section 202 (and other sections of color conversion space 200) may be divided into prism subsections using any suitable configuration.

As discussed, section 202 (and other sections of color conversion space 200) may be divided into tetrahedron subsections, prism subsections, pyramid subsections, or the like.

Figure 6:
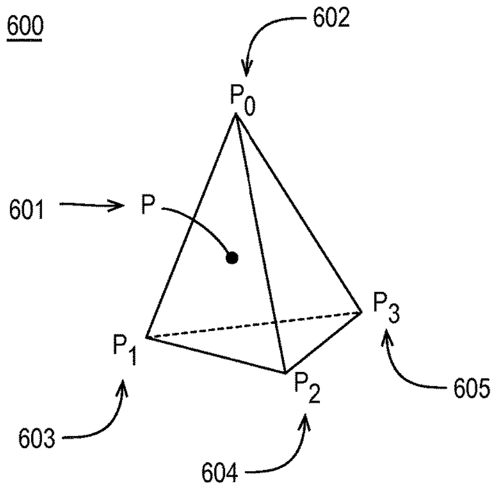
FIG. 6 illustrates an example tetrahedron subsection and example input color channel values 601 lying within the tetrahedron subsection.

FIG. 6 illustrates an example tetrahedron subsection 600 and example input color channel values 601 lying within tetrahedron subsection 600, arranged in accordance with at least some implementations of the present disclosure. As shown in FIG. 6, tetrahedron subsection 600 may include vertices 602-605 (labeled $P_0$, $P_1$, $P_2$, $P_3$) and input color channel values 601 (labeled P) my lie within tetrahedron subsection 600. As discussed with respect to array of ordered coefficients module 103 of FIG. 1, based on which subsection within which input color channel values 601 are contained, array of ordered coefficients 104 may be provided. Such coefficients may be associated with the pertinent subsection and section and may provide, when combined via a dot product or the like, with offset values 105 (and, optionally, constant 108) a converted color value result (e.g., converted color value 107). For example, array of ordered coefficients 104 may be predetermined and implemented via a look up table or the like.

Figure 7:
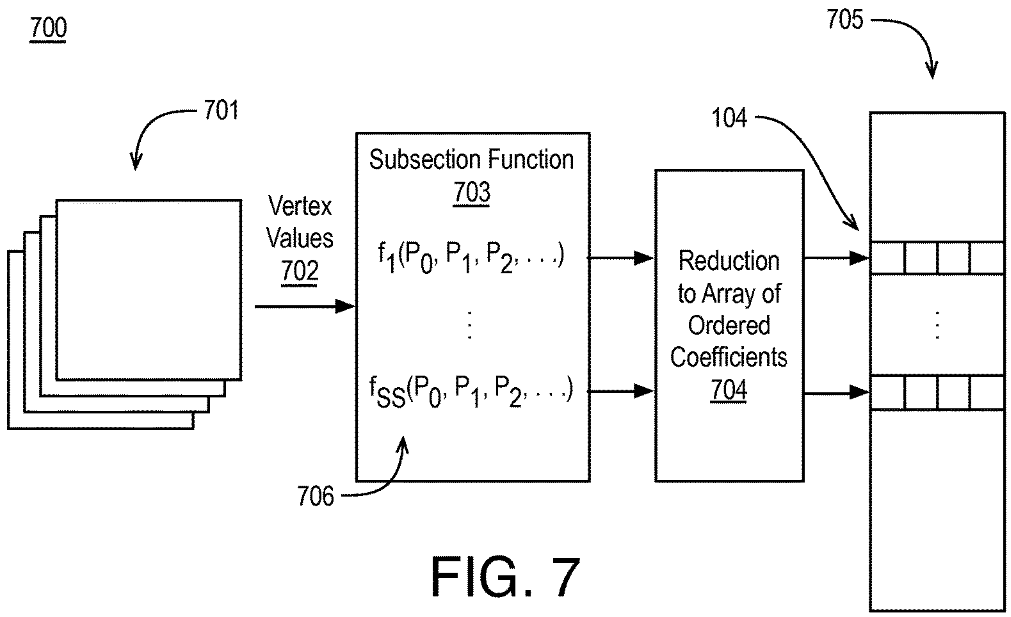
FIG. 7 illustrates an example device for generating a look up table including arrays of ordered coefficients.

FIG. 7 illustrates an example device 700 for generating a look up table including arrays of ordered coefficients, arranged in accordance with at least some implementations of the present disclosure. As shown in FIG. 7, device 700 may include look up table 701, a subsection function module 703, and as reduction to array of ordered coefficients module 704 to generate a look up table 705. Device 700 may be any suitable form factor device such as a computer, a laptop computer, a tablet, a smart phone, a multifunction device, a gaming console, a display device, or the like. In some examples, device 100 and device 700 may be the same device and, in other examples, they may be different. For example, look up table 705 may be generated via a remote device and implemented via device 100 (or device 800 or any other device discussed herein) via a transfer to a memory of device 100.

As shown, look up table 701 may be accessed to determine vertex values 702. For example, vertex values 702 may provide vertex values for a section or sections of a color conversion space such as section 202 of color conversion space 200 (please refer to FIG. 2). For example, vertex values 702 may include color conversion values associated with vertices of sections of a color conversion space. The color conversion values may be used to determine output color channel values for input color channel values within the pertinent subsection and section of a color conversion space. For example, with reference to FIG. 6, input color channel values 601 may be converted to an output color channel value based on vertex values associated with vertices 602-605. For example, the output color channel value may be determined via interpolation based on the vertex values and may be dependent on the tetrahedron that the input color channel values are within such that the output color channel value may be a function of the vertex values of the tetrahedron. Similarly, output color channel values may be determined for other subsection shapes (e.g., prism or pyramid or the like) based on vertex values for vertices of those shapes.

As discussed herein, color conversion space 200 may include L×M×N sections and, similarly, look up table 701 may be an L×M×N look up table that may provide, for each section, 8 vertices (e.g., color conversion values associated with the 8 vertices of a section in 3D cube section examples). As shown, vertex values 702 may be received by subsection function module 703, which may provide subsection functions 706 for subsections of the section of the color conversion space 200. For example, each function of subsection functions 706 may provide a conversion function for a subsection of the section. In the example of a section divided into tetrahedral, subsection functions 706 may include 6 subsection functions each associated with a tetrahedron subsection. In such examples, the number of subsection functions, SS, may be 6 for example and $f_1$ may be associated with $T_1$ (please refer to FIG. 3), $f_2$ may be associated with $T_2$, and so on. Also as shown, each of subsection functions 706 may be a function of a subset of vertex values 702 (e.g., illustrated as $P_0$, $P_1$, $P_2$, . . . ). Continuing the example of tetrahedron subsections, $f_1$ may be a function of vertices $P_{000}$, $P_{100}$, $P_{110}$, $P_{111}$ (please refer to FIG. 3), $f_2$ may be a function of vertices $P_{000}$, $P_{100}$, $P_{101}$, $P_{111}$, and so on.

As shown, subsection functions 706 may be provided to reduction to array of ordered coefficients module 704, which may reduce (or solve or force to or the like) the received functions to a form as shown with respect to Equation (1). Such reduction may be predefined for particular shapes (e.g., each tetrahedron shape may be solved in general and vertex values 702 may be provided for each section of color conversion space 200) for example. The values determined for $C_1$, $C_2$, $C_3$, and $C_4$ (e.g., for a particular subsection of a particular section of the pertinent color conversion space) may then stored via look up table 705. For example, look up table 705 may store arrays of ordered coefficients that may be indexed (or accessed) based on input color conversion values 101. Look up table 705 may be indexed using any suitable configuration such as indexing based on high and low bits of input color conversion values 101 as is discussed further with respect to FIG. 8. For example, look up table 705 may be a sparsely populated array or look up table including arrays of ordered coefficients for subsections of sections of a color conversion space. Such a look up table may be implemented to perform quick and computationally efficient color conversions between color spaces.

Figure 8:
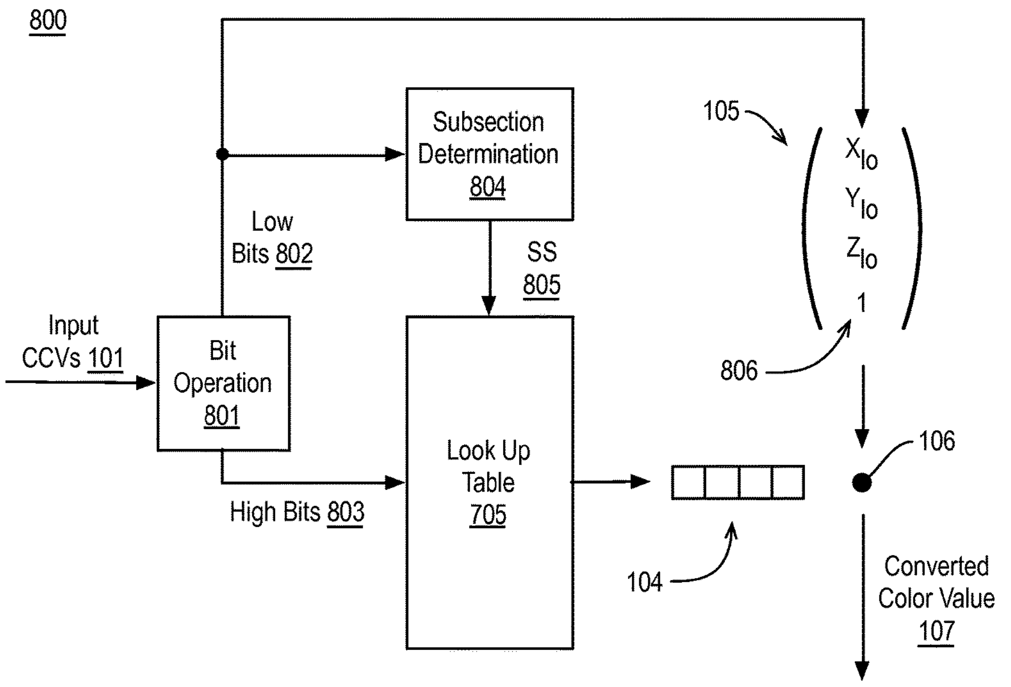
FIG. 8 illustrates an example device for performing color conversion.

FIG. 8 illustrates an example device 800 for performing color conversion, arranged in accordance with at least some implementations of the present disclosure. As shown in FIG. 8, device 800 may include a bit operation module 801, look up table 705, a subsection determination module 804, and color conversion operation module 106, which is illustrated as performing a dot product in the example of FIG. 8. Device 800 may be any suitable form factor device such as a computer, a laptop computer, a tablet, a smart phone, a multifunction device, a gaming console, a display device, or the like. For example, device 800 may perform color conversion as discussed herein.

As shown, input color channel values 101 may be received via bit operation module 801. Bit operation module 801 may extract high bits 803 and low bits 802 for each channel value of input color channel values 101. For example, if each channel value comprises an 8-bit value, bit operation module 801 may extract the first 4 bits as high bits and the last 4 bits as low bits. For example, if a color channel value is 146 in base ten, the 8-bit color channel value may be 10010010 such that the high bits may be 1001 (representing a value of 144 in base ten) and the low bits may be 0010 (representing a value of 2 in base ten).

High bits 803 (e.g., high bits for each color channel) may be transferred to look up table 705, which may use high bits 803 as index values. For example, look up table 705 may be an L×M×N×SS×CN look up table such that L, M, and N represent the number of sections in the X, Y, and Z directions respectively (e.g., for 3D color conversion spaces), SS represents the number of subsections in each section, and CN represents the number of coefficients in the array of ordered coefficients for the subsections of the sections of the color conversion space. In the example of FIG. 2, L=M=N=8. In another example, if Xmax=Ymax=Zmax=256 with each including 16 values, L=M=N=16. However, as discussed, L, M, and N may be any suitable values. Furthermore, SS may represent the number of subsections in each section such that in the example of tetrahedron subsections, SS=6, in the example of prism subsections, SS=2, and in the example of pyramid subsections, SS=4. However, as discussed, any number of subsections may be used and, in some examples, different sections may have different configurations or numbers of subsections. Also, CN may represent the number of coefficients in the array of ordered coefficients such that CN may be 4 in the example of a 3D color conversion space with use of a constant and CN may be 5 in the example of a 4D color conversion space with use of a constant.

As discussed, look up table 705 may be indexed, in part, by high bits 803. For example, high bits 803 may indicate which section of a color conversion space input color channel values are within. For example, low bits 802 may not be needed to determine which section conversion space input color channel values are within. For example, when the color conversion space comprises values (in each channel) from 0 to 255 (e.g., Xmax=Ymax=Zmax=256) divided into 16×16×16 sections (e.g., L=M=N=16), the four high bits may indicate which section input color channel values are within. In such examples, the four high bits may range from values of 0 to 15 (e.g., thus indicating which of 16 sections that channel lies within). For example, such high bits 803 may provide a high component of each color channel or a gross coordinate for each color channel, or the like. In some examples, the high component or gross coordinate may be provided as Xhi=X/Xmax*L, Yhi=Y/Ymax*L, and Zhi=Z/Zmax*L such that values within [0, 1) are in a first section, [1, 2) are in a first section, and so on. In some examples, preprocessing or pre-indexing may be performed based on input color channel values 101 to determine a section of the color conversion space prior to accessing look up table 705. Although discussed with respect to 8-bit implementations with 4 high bits and 4 low bits, any number of bits and any number of high and low may be implemented.

As shown, low bits 802 (e.g., low bits for each color channel) may be transferred to subsection determination module 804 and color conversion operation module 106. Subsection determination module 804 may determine a subsection for input color channel values 101 based on low bits 802 and subsection determination module 804 may provide the determined subsection as subsection signal (SS) 805. For example, as discussed, high bits 803 may indicate which section input color channel values 101 are within. Furthermore, low bits 802 may indicate which subsection input color channel values 101 are within. For example, low bits 802 may represent an offset of input color channel values 101 within its section. Subsection determination module 804 may determine which subsection input color channel values 101 based on low bits 802 using any suitable technique or techniques. For example, for tetrahedron implementations, low bits 802 may be compared such that if $X_{LB}>Y_{LB}>Z_{LB}$ (e.g., such that $X_{LB}$ are the X dimension low bits, $Y_{LB}$ are the Y dimension low bits, and $Z_{LB}$ are the Z dimension low bits) subsection signal 805 indicates tetrahedron 1 (please refer to FIG. 3), if $X_{LB}>Z_{LB}>Y_{LB}$ subsection signal 805 indicates tetrahedron 2, if $Z_{LB}>X_{LB}>Y_{LB}$ subsection signal 805 indicates tetrahedron 3, if $Y_{LB}>X_{LB}>Z_{LB}$ subsection signal 805 indicates tetrahedron 4, if $Y_{LB}>Z_{LB}>X_{LB}$ subsection signal 805 indicates tetrahedron 5, and if $Z_{LB}>Y_{LB}>X_{LB}$ subsection signal 805 indicates tetrahedron 6. However, as discussed, any subsection configuration, shapes, or the like may be used.

As discussed, subsection determination module 804 may determine subsection signal 805 based on low bits 802. Subsection determination module 804 may determine subsection signal 805 using any suitable technique or techniques. In some examples, subsection determination module 804 may implement a single instruction multiple data (SIMD) operation on low bits 802. For example, the SIMD operation may include a simd_lt or a simd_gt operation or the like.

As shown, look up table 705 may be indexed, in part, based on subsection signal 805. For example, look up table 705 may be indexed based on high bits 803 (or a predetermined index value based on high bits 803) and subsection signal 805. For example, look up table 705 may be accessed based on high bits 803 (which may indicate a section as discussed) and subsection signal 805 (which may indicate a subsection as discussed). Look up table 705 may output, or provide via an access, array of ordered coefficients 104 for input color channel values 101. As shown, array of ordered coefficients 104 and offset values 105 (e.g., as indicated or provided via low bits 802 and labeled in FIG. 8 as $X_{lo}$, $Y_{lo}$, and $Z_{lo}$) and a constant 806 (e.g., similar to constant 108 and implemented as a value of 1, although any suitable value may be used) may be received by color conversion operation module 106.

Color conversion operation module 106 may generate converted color value 107 based on array of ordered coefficients 104 and offset values 105 and constant 806). For example, color conversion operation module 106 may determine a dot product of array of ordered coefficients 104 and offset values 105 and constant 806 such that converted color value 107 is a sum of products of ordered coefficients and offset values/constants (e.g., $CCV=C_1\times X_{lo}+C_2\times Y_{lo}+C_3\times Z_{lo}+C_4$ in analogy to Equation (1)). Color conversion operation module 106 may generate converted color value 107 using any suitable technique or techniques. In some examples, color conversion operation module 106 may perform the discussed dot product via a SIMD operation implemented via a central processing unit or a graphics processing unit.

Furthermore, as shown, look up table 705 may provide array of ordered coefficients 104 for input color channel values 101, which may be utilized to generate converted color value 107. Converted color value 107, as discussed, may provide a single color channel value based on input color channel values 101 (e.g., as associated with a pixel an input image). Such processing may be repeated (e.g., using different look up tables) to determine other color channel values based on input color channel values 101 to provide a full mapping to a converted color space.

In other examples, look up table 705 may provide multiple arrays of ordered coefficients based on a single look up. For example, the two or more arrays of ordered coefficients may be concatenated arrays of ordered coefficients that may, when separated and processed with offset values 105 and constant 806), provide for individual color channel values. For example, in mapping to a 3D color space, three converted color values may be generated. If the input color space is also 3D, three arrays of ordered coefficients having four elements may be needed (e.g., 1 for each output color channel). In such examples, look up table 705 may provide a 12 element array including the three arrays of ordered coefficients concatenated (or the like). Color conversion operation module 106 may then receive the 12 element array, separate it, at take three dot products with offset values 105 and constant 806 (e.g., one dot product for each output color channel) or provide similar processing to generate three converted color values. Although discussed with respect to 3D color conversions, other color conversions (e.g., from 4D or n-D and/or to 4D or n-D color conversions) may be implemented using such techniques.

Furthermore, look up table 705 may be implemented to take advantage of and/or eliminate redundancies in arrays of ordered coefficients. For example, look up table 705 may include predetermined values arranged such that they may be easily loaded into SIMD arrays and the discussed dot product processing or similar calculations may be performed simply and with less use of memory bandwidth and processing resources. For example, in comparison to prior techniques, the described techniques may provide color conversion results significantly faster such as about 22% for un-vectorized inputs and 29% faster for vectorized inputs.

Figure 9:
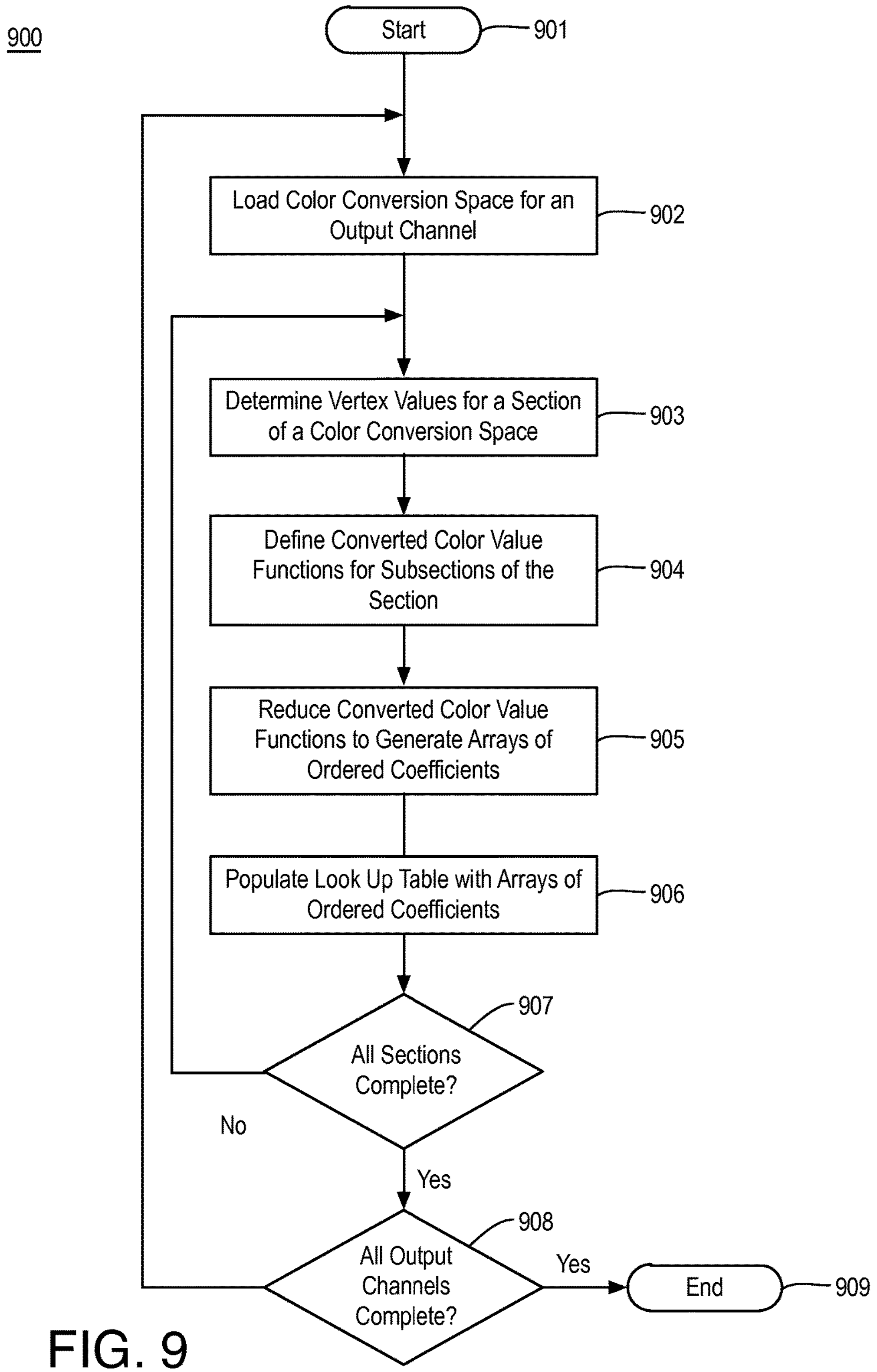
FIG. 9 illustrates an example process for generating a look up table including arrays of ordered coefficients.

FIG. 9 illustrates an example process 900 for generating a look up table including arrays of ordered coefficients, arranged in accordance with at least some implementations of the present disclosure. Process 900 may include one or more operations 901-909 as illustrated in FIG. 9. Process 900 may be performed by a device (e.g., device 700 or any other devices discussed herein) or portions of process 900 may be performed by a device to generate look up tables including arrays of ordered coefficients. Process 900 or portions thereof may be repeated for any number of look up tables.

As shown, process 900 may begin from start operation 901 at operation 902. "Load Color Conversion Space for an Output Channel", where a color conversion space may be loaded for an output channel. For example, the color conversion space may be implemented via a look up table such as an L×M×N look up table (e.g., in 3D implementations) indexed by input color channel values and providing vertex values associated with a color conversion for a section of the color conversion space. For example, the look up table may be a sparsely populated look up table that provides section vertex values for each section of a color conversion space. For example, the look up table may include vertex values for sections of color conversion space 200 including example section 202 such that the look up table includes vertex values associated with vertices $P_{000}$, $P_{001}$, $P_{101}$, $P_{100}$, $P_{011}$, $P_{111}$, $P_{010}$, and $P_{110}$ of section 202 and, similarly, vertex values for other sections of color conversion space 200.

Processing may continue at operation 903, "Determine Vertex Values for a Section of a Color Conversion Space", where vertex values may be determined for a section of the color conversion space. For example, for a first section of the color conversion space, vertex values may be determined. Such vertex values may be associated with vertices of the first section and may provide, when implemented via interpolation functions for subsections of the section or the like, color conversion for the first section. For example, the vertex values may be associated with vertices of the section as discussed with respect to section 202 and operation 902.

Processing may continue at operation 904, "Define Converted Color Value Functions for Subsections of the Section", where converted color value functions may be defined for subsections of the section. For example, the converted color value functions (or subsection function) may implement interpolation within defined subsections of the section and based on the vertex values of the defined subsections. The converted color value functions may depend, therefore, on the implemented subsection shapes and configurations. In some examples, the converted color value functions may be interpolation functions based on volumetric weighting. For example, the converted color value functions may define as variables the input color channel value offsets within the section and may determine output color channel values based on the variable input color channel value offsets. In an example, a converted color value function may be defined as $CCV=f(X_{offset}, Y_{offset}, Z_{offset})$, where CCV is the converted color value and $X_{offset}$, $Y_{offset}$, $Z_{offset}$ is the input color channel value offset within the section.

Processing may continue at operation 905, "Reduce Converted Color Value Functions to Generate Arrays of Ordered Coefficients", where the converted color value functions may be reduced to generate arrays of ordered coefficients. For example, the functions generated at operation 904 may be reduced to linear functions of the form discussed with respect to Equation (1). In some examples, operations 904 and 905 may be performed together or the operations may be batched such that general solutions to the reduction of functions for particular shapes may be generated and retrieved vertex values may be provided to the general solutions. The arrays of ordered coefficients may be generated based on the linear functions. For example, an array of ordered coefficients may be determined as the coefficients of the linear terms as shown in Equation (1) (e.g., $C_1$, $C_2$, $C_3$, $C_4$). Similarly, multiple arrays of ordered coefficients may be determined for each subsection of the current section (e.g., based on the coefficients of the linear terms for each subsection function).

Processing may continue at operation 906, "Populate Look Up Table with Arrays of Ordered Coefficients", where a look up table may be populated with the arrays of ordered coefficients determined via operations 903-905. For example, the arrays of ordered coefficients may be loaded into the look up table and indexed based on the section and subsection associated with the array of ordered coefficients.

Processing may continue at decision operation 907, "All Sections Complete?", where a determination may be made as to whether all sections of the color conversion space have been processed. If not, processing may continue at operation 903 as discussed, where arrays of ordered coefficients may be generated for another section of the color conversion space. Such processing may be repeated until all sections of the color conversion space have been processed. If all sections of the color conversion space have been processed, processing may continue at decision operation 908, "All Output Channels Complete", where a determination may be made as to whether all output channels have been processed. If not, processing may continue at operation 902 where a color conversion space may be loaded for another output channel (e.g., of an output color space) and a look up table may be generated and loaded based for the output channel. Such processing may be repeated until look up tables have been generated for all output channels of a target or output color conversion space. If all output channels have been processed, process 900 may end at end operation 909.

As discussed, process 900 may be used to generate one or more look up tables populated with arrays of ordered coefficients and indexed based on the section and subsection associated with each array. Such look up tables may be implemented to perform color conversion operations. Although discussed herein with respect to look up tables, such arrays of ordered coefficients may be implemented via any suitable data structure or memory structure.

Figure 10:
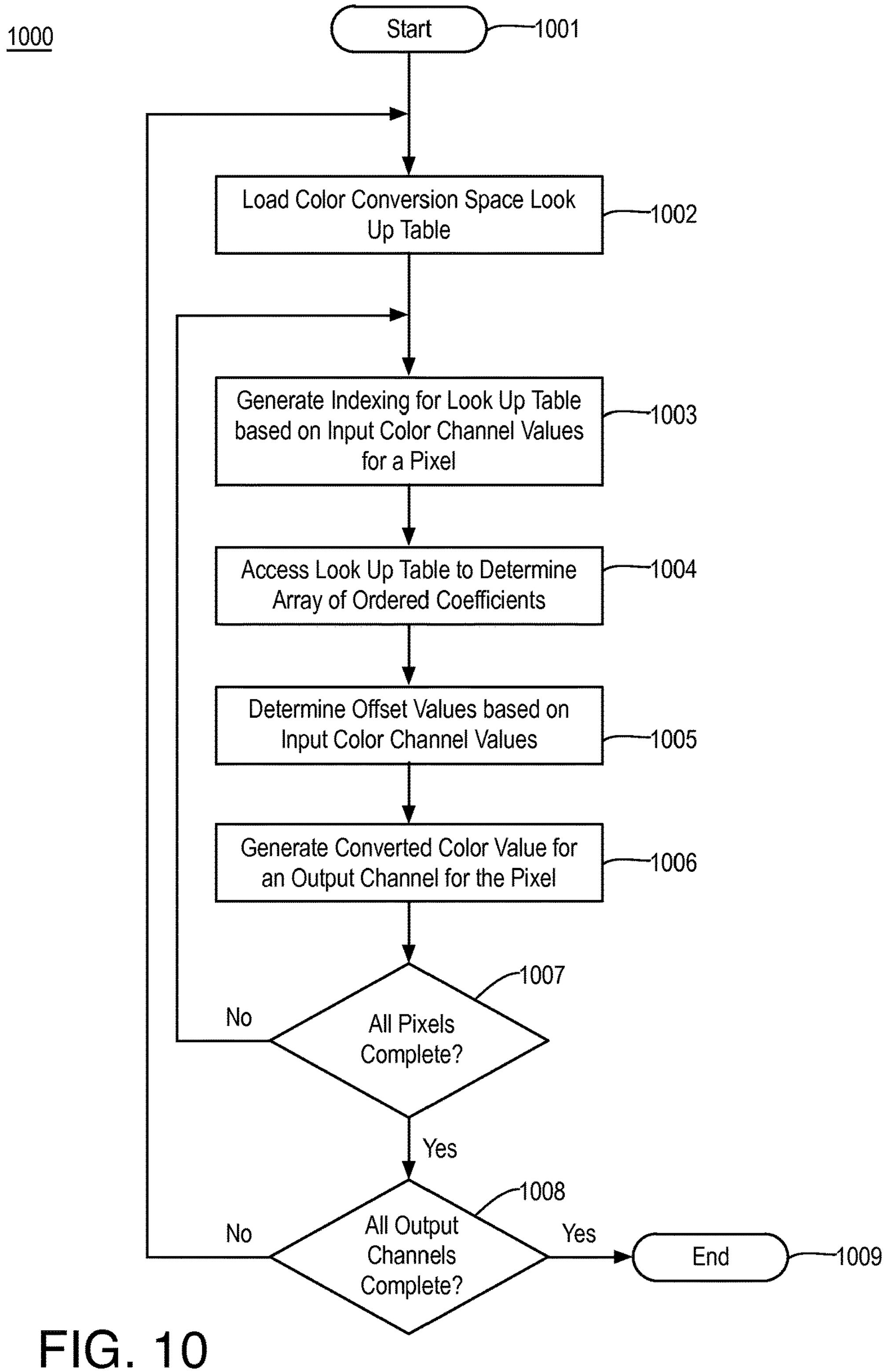
FIG. 10 illustrates an example process for performing color conversion.

FIG. 10 illustrates an example process 1000 for performing color conversion, arranged in accordance with at least some implementations of the present disclosure. Process 1000 may include one or more operations 1001-1009 as illustrated in FIG. 10. Process 1000 may be performed by a device (e.g., devices 100 or 800 or any other devices discussed herein) or portions of process 1000 may be performed by a device to provide color conversion. For example, process 1000 may be performed to convert an input image from a first color space to a second color space. Process 1000 or portions thereof may be repeated for any number of color conversions.

As shown, process 1000 may begin from start operation 1001 at operation 1002, "Load Color Conversion Space Look Up Table", where a color conversion space look up table may be loaded. The color conversion space look up table may be associated with a color conversion to a color channel for pixels of an input image. For example, the color conversion space look up table may include arrays of ordered coefficients indexed based on sections and subsections of a color conversion space. Such a look up table may be organized to reduce duplication and to provide efficient organization for look up of such arrays of ordered coefficients. In some examples, the color conversion space look up table may be look up table 705 or the like. For example, look up table 705 may be loaded at operation 1002.

Processing may continue at operation 1003, "Generate Indexing for Look Up Table based on Input Color Channel Values for a Pixel", where an indexing for the look up table may be generated based on input color channel values for a pixel. For example, the pixel may be a pixel of an input image as discussed herein. For example, the look up table indexing may include a section indicator and a subsection indicator for the input color channel values. In some examples, the section indicator may include high bits of the input color channel values such as high bits 803. In other examples, the section indicator may be a preprocessed indicator based on the input color channel values. Furthermore, the subsection indicator may be a preprocessed indicator based on low bits of the input color channel values. The preprocessing may indicate a subsection of the section and may be determined using a SIMD instruction or the like. For example, high bits 803 (or another section indexing value or values) and subsection signal 805 may be determined at operation 1003.

Processing may continue at operation 1004, "Access Look Up Table to Determine Array of Ordered Coefficients", where the look up table may be accessed based on the indexing determined at operation 1003 to determine an array of ordered coefficients for the input color channel values. The array of ordered coefficients may include any number of coefficients such as N+1 (for a n-D input color conversion space) associated with each dimension of the input color conversion space and a constant. For example, array of ordered coefficients 104 may be determined at operation 1004.

Processing may continue at operation 1005, "Determine Offset Values based on Input Color Channel Values", where offset values may be determined based on the input color channel values. For example, the offset values may be based on the offset of the input color channel values within the section it resides in. For example, the offset values may be the differences between the input color channel values and origin values of the section (e.g., values of the section corner closest to the origin of the color conversion space). In some examples, the offset values may be low bits of the input color channel values. For example, offset values 105 may be determined at operation 1005.

Processing may continue at operation 1006, "Generate Converted Color Value for an Output Channel for the Pixel", where a converted color value may be determined for an output channel for the pixel. For example, the converted color value may be determined as a dot product of the array of ordered coefficients and the offset values and a constant (e.g., a constant of 1), In some examples, the converted color value may be determined based on a SIMD operation implemented via a graphics processing unit. Such a SIMD operation based on the predetermined array of ordered coefficients (e.g., as stored within the look up table) and the offset values determined, at operation 1005 may provide fast and efficient color conversion to generate the converted color value. For example, converted color value 107 may be determined at operation 1006.

Processing may continue at decision operation 1007, "All Pixels Complete?", where a determination may be made as to whether all pixels of an input image have completed processing. If not, processing may continue at operations 1003-1006, where an output color channel value may be determined for another pixel. Such processing may continue until all pixels are complete. If all pixels have completed processing, process 1000 may continue at decision operation 1008, "All Output Channels Complete?", where a determination may be made as to whether all output channels have been processed for an input image. If not, processing may continue at operation 1002 where a color conversion space look up table may be loaded for another output color channel and operations 1003-1007 where color values may be generated for all pixels for the output color channel. Such processing may be repeated until all output color channels have been processed. If all output channels have been processed, process 1000 may end at ending operation 1009 such that all output color channel values have been determined for all pixels of the input image (e.g., to generate a color converted output image).

Process 1000 illustrates a nested loop structure such that color channel values may be generated on a pixel-by-pixel basis for all pixels for a first color channel (e.g., based on loading the associated color conversion space look up table associated with the first color channel) and then second channel values may be determined on a pixel-by-pixel for all pixels for a second color channel (e.g., based on loading the associated color conversion space look up table associated with the second color channel), and so on. Such processing may save on repeated loads of different look up tables. However, process 1000 may be implemented in any suitable manner. For example, a look up table may provide all color channel arrays such that pixels may be processed all at once (e.g. all output color channel values may be determined), or the like. Furthermore, various aspects of process 1000 may be implemented in parallel to increase processing speed.

Figure 11:
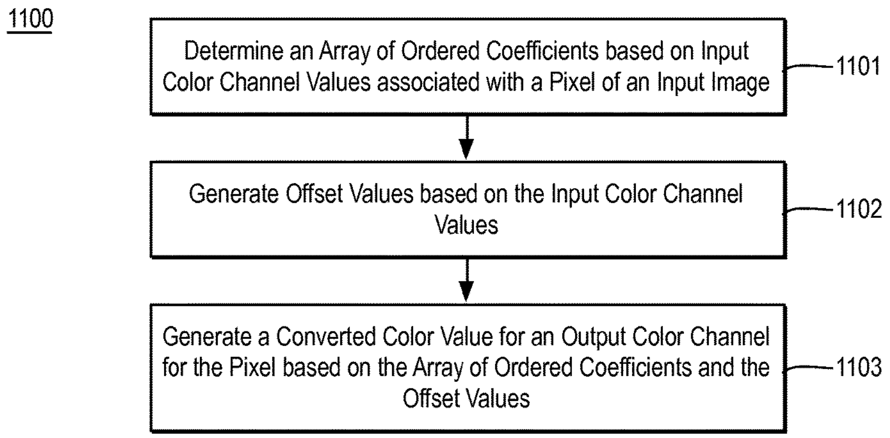
FIG. 11 is a flow diagram illustrating an example process for performing color conversion.

FIG. 11 is a flow diagram illustrating an example process 1100 for performing color conversion, arranged in accordance with at least some implementations of the present disclosure. Process 1100 may include one or more operations 1101-1103 as illustrated in FIG. 11. Process 1100 may form at least part of a color conversion process. By way of non-limiting example, process 1100 may form at least part of a color conversion process performed by device 100 or device 800 as discussed herein. Furthermore, process 1100 will be described herein with reference to system 1200 of FIG. 12.

Figure 12:
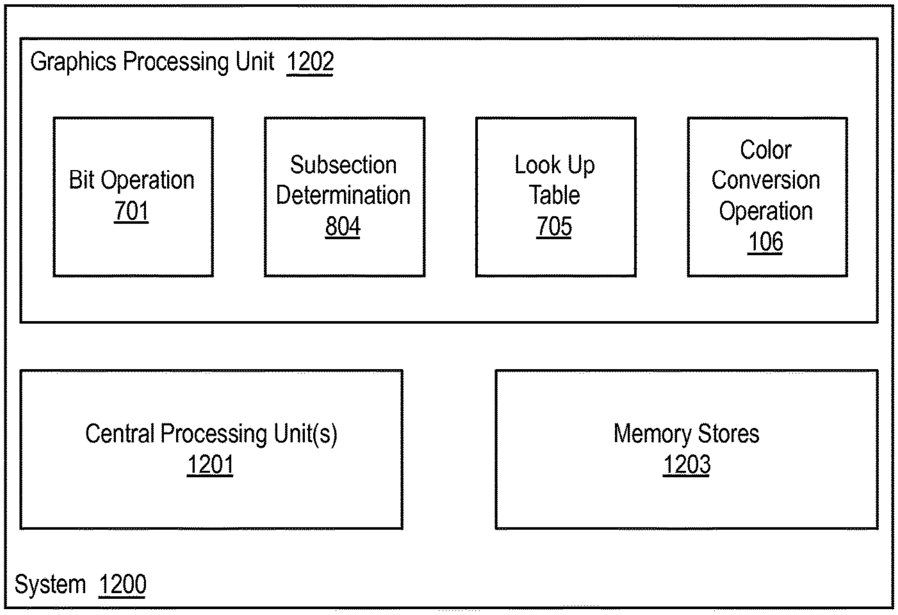
FIG. 12 is an illustrative diagram of an example system for performing color conversion.

FIG. 12 is an illustrative diagram of an example system 1200 for performing color conversion, arranged in accordance with at least some implementations of the present disclosure. As shown in FIG. 12, system 1200 may include one or more central processing units (CPU) 1201, a graphics processing unit 1202, and memory stores 1203. Also as shown, graphics processing unit 1202 may include bit operation module 801, subsection determination module 804, look up table 705, and color conversion operation module 106. Such modules may be implemented to perform operations as discussed herein. In the example of system 1200, memory stores 1203 may store input images, pixel data, input color channel values, look up tables, arrays of ordered coefficients, high bits, low bits, offset values, converted color values, output color values, output images, color conversion space data, sectioning data, sub-sectioning data, or the like.

As shown, in some examples, bit operation module 801, subsection determination module 804, look up table 705, and color conversion operation module 106 may be implemented via graphics processing unit 1202. In other examples, one or more or portions of bit operation module 801, subsection determination module 804, look up table 705, and color conversion operation module 106 may be implemented via central processing units 1201 or an image processing unit (not shown) of system 1200. In yet other examples, one or more or portions of bit operation module 801, subsection determination module 804, look up table 705, and color conversion operation module 106 may be implemented via an imaging processing pipeline, graphics pipeline, or the like.

Graphics processing unit 1202 may include any number and type of graphics processing units, that may provide the operations as discussed herein. Such operations may be implemented via software or hardware or a combination thereof. For example, graphics processing unit 1202 may include circuitry dedicated to manipulate image data obtained from memory stores 1203 (e.g., input images, pixel data, or the like). Central processing units 1201 may include any number and type of processing units or modules that may provide control and other high level functions for system 1200 and/or provide any operations as discussed herein. Memory stores 1203 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1203 may be implemented by cache memory. In an embodiment, one or more or portions of bit operation module 801, subsection determination module 804, look up table 705, and color conversion operation module 106 may be implemented via an execution unit (EU) of graphics processing unit 1202. The EU may include, for example, programmable logic or circuitry such as a logic core or cores that may provide a wide array of programmable logic functions. In an embodiment, one or more or portions of bit operation module 801, subsection determination module 804, look up table 705, and color conversion operation module 106 may be implemented via dedicated hardware such as fixed function circuitry or the like. Fixed function circuitry may include dedicated logic or circuitry and may provide a set of fixed function entry points that may map to the dedicated logic for a fixed purpose or function. In some embodiments, one or more or portions of bit operation module 801, subsection determination module 804, look up table 705, and color conversion operation module 106 may be implemented via an application specific integrated circuit (ASIC). The ASIC may include an integrated circuitry customized to perform the operations discussed herein.

Returning to discussion of FIG. 11, process 1100 may begin at operation 1101, "Determine an Array of Ordered Coefficients based on Input Color Channel Values associated with a Pixel of an Input Image", where an array of ordered coefficients may be determined based on input color channel values associated with a pixel of an input image. For example, the input image comprising the color channel values for pixels of the input image may be received from processing via memory stores 1203. Furthermore, the array of ordered coefficients may be associated with a subsection within a section of a color conversion space. In some examples, the array of ordered coefficients may be implemented via a look up table such as look up table 705. In some examples, determining the array of ordered coefficients may include accessing the look up table based on the input color channel values. For example, the look up table may be indexed or accessed based on section and/or subsection that the input color channel values reside in. For example, subsection determination module 804 as implemented via graphics processing unit 1202 may determine the subsection for indexing or accessing the look up table.

In some examples, the subsection may be determined from multiple candidate subsections prior to accessing the look up table such that the candidate subsections make up the section of the color conversion space. For example, the section may be a cube and the candidate subsections may be tetrahedrons, prisms, pyramids or the like, that together make up the cube (e.g., the section may be divided into the candidate subsections) as illustrated with respect to FIG. 2. For example, memory stores 1203 may store look up table 705, graphics processing unit 1202 may load the look up table 705 and graphics processing unit 1202 may determine the array of ordered coefficients based on accessing the look up table. In other examples, graphics processing unit 1202 may receive the array of ordered coefficients based on accessing the look up table as implemented via memory store 1203.

Processing may continue at operation 1102, "Generate Offset Values based on the Input Color Channel Values", where offset values may be generated based on the input color channel values and the section of the color conversion space. For example, bit operation 701 as implemented via graphics processing unit 1202 may determine the offset values as low bit values of the input color channel values. In some examples, the offset values may include an offset value for each input color channel as a difference between the input color channel values and origin values of the section of the color conversion space as discussed herein. Such offset values may be determined via bit operations as low bit values as discussed or using any other technique or techniques that provide such offset values.

Processing may continue at operation 1103, "Generate a Converted Color Value for an Output Color Channel for the Pixel based on the Array of Ordered Coefficients and the Offset Values", where a converted color value for an output color channel for the pixel may be generated based on the array of ordered coefficients and the offset values. For example, color conversion operation module 106 as implemented via graphics processing unit 1202 may generate converted color value 107. In some examples, generating the converted color value may include determining a dot product of the offset values and the array of ordered coefficients. For example, such a dot product may include or be performed based on a single instruction multiple data operation. In some examples, the array of ordered coefficients include four elements, the offset values include three values, and generating the converted color value includes a dot product of the four array of ordered coefficients with the three offset values and a constant. Such an example may provide for conversion from a 3D color space and may implement a constant with the offset values as discussed herein, for example.

Furthermore, in some examples, a second array of ordered coefficients may be determined based on the input color channel values and a second converted color value may be generated for a second output color channel for the pixel based on the second array of ordered coefficients and the offset values. Such processing may be repeated for any number output color channels such as three or four output color channels. In some examples, the second array of ordered coefficients may be determined based on accessing a second look up table and, in other examples, the second array of ordered coefficients may be determined based on a single access to a look up table including the array of ordered coefficients and the second array of ordered coefficients.

The look up table as discussed with respect to operations 1101 may be generated using any suitable technique or technique such as those discussed with respect to FIG. 9. In some examples, the look up table may be generated based on determining vertex values associated with the section (e.g., via accessing a look up table such as look up table 701), defining converted color value functions each associated with one of a plurality of subsections of the section (e.g., subsection functions 706), reducing the converted color value functions to linear functions based on position offsets within the subsections, and providing arrays of ordered coefficients for the subsections as linear coefficients of the linear functions. Such arrays of ordered coefficients may be loaded into a look up table such as look up table 705 as discussed herein.

Process 1100 may provide for color conversion between a first and a second color space. Process 1100 may be repeated any number of times either in series or in parallel for any number of color space conversions.

Various components of the systems described herein may be implemented in software, firmware, and/or hardware and/or any combination thereof. For example, various components of device 100, device 700, device 800, system 1200, system 1300, or device 1400 may be provided, at least in part, by hardware of a computing System-on-a-Chip (SoC) such as may be found in a multi-function device or a cut-sheet production printing press or a computing system such as, for example, a computer, a laptop computer, a tablet, or a smart phone. For example, such components of modules may be implemented via a multi-core SoC processor. Those skilled in the art may recognize that systems described herein may include additional components that have not been depicted in the corresponding figures.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of device 100, device 700, device 800, system 1200, system 1300, or device 1400, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 13:
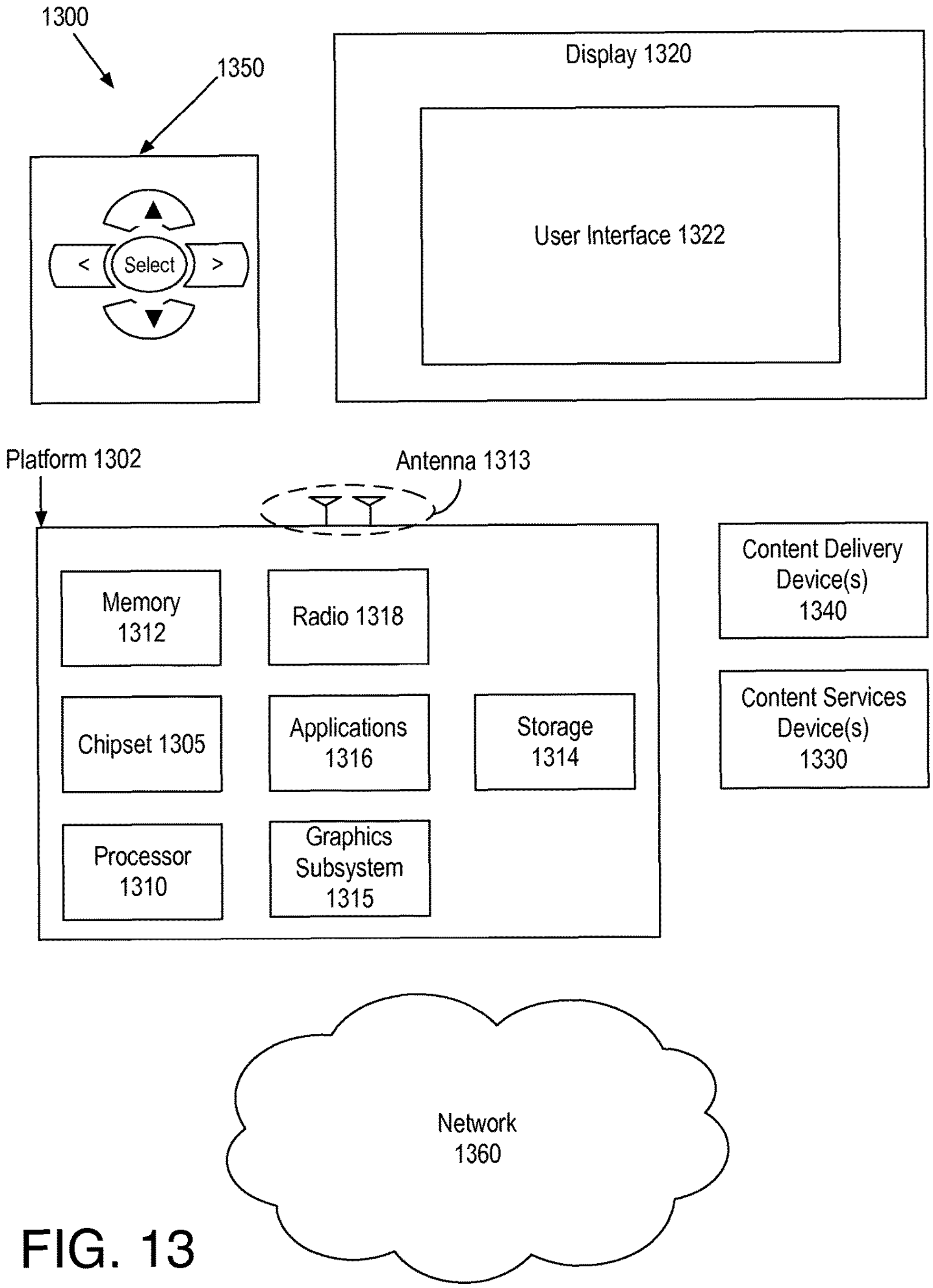
FIG. 13 is an illustrative diagram of an example system.

FIG. 13 is an illustrative diagram of an example system 1300, arranged in accordance with at least some implementations of the present disclosure. In various implementations, system 1300 may be a computing system although system 1300 is not limited to this context. For example, system 1300 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, peripheral device, scanner, printer, multi-function device, and so forth.

In various implementations, system 1300 includes a platform 1302 coupled to a display 1320. Platform 1302 may receive content from a content device such as content services device(s) 1330 or content delivery device(s) 1340 or other similar content sources such as a printer/scanner. A navigation controller 1350 including one or more navigation features may be used to interact with, for example, platform 1302 and/or display 1320. Each of these components is described in greater detail below.

In various implementations, platform 1302 may include any combination of a chipset 1305, processor 1310, memory 1312, antenna 1313, storage 1314, graphics subsystem 1315, applications 1316 and/or radio 1318. Chipset 1305 may provide intercommunication among processor 1310, memory 1312, storage 1314, graphics subsystem 1315, applications 1316 and/or radio 1318. For example, chipset 1305 may include a storage adapter (not depicted) capable of providing intercommunication with storage 1314.

Processor 1310 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1310 may be dual-core processor(s), dual-core mobile processor(s), and so forth.

Memory 1312 may be implemented as a volatile memory device such as, but not limited to, a Random Access Memory (RAM), Dynamic Random Access Memory (DRAM), or Static RAM (SRAM).

Storage 1314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1314 may include technology to increase the storage performance enhanced protection for valuable digital media when multiple hard drives are included, for example.

Graphics subsystem 1315 may perform processing of images such as still images, graphics, or video for display. Graphics subsystem 1315 may be a graphics processing unit (GPU), a visual processing unit (VPU), or an image processing unit, for example. In some examples, graphics subsystem 1315 may perform scanned image rendering as discussed herein. An analog or digital interface may be used to communicatively couple graphics subsystem 1315 and display 1320. For example, the interface may be any of a High-Definition Multimedia Interface, DisplayPort, wireless HDMI, and/or wireless HD compliant techniques. Graphics subsystem 1315 may be integrated into processor 1310 or chipset 1305. In some implementations, graphics subsystem 1315 may be a stand-alone device communicatively coupled to chipset 1305.

The image processing techniques described herein may be implemented in various hardware architectures. For example, image processing functionality may be integrated within a chipset. Alternatively, a discrete graphics and/or image processor and/or application specific integrated circuit may be used. As still another implementation, the image processing may be provided by a general purpose processor, including a multi-core processor. In further embodiments, the functions may be implemented in a consumer electronics device.

Radio 1318 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1318 may operate in accordance with one or more applicable standards in any version.

In various implementations, display 1320 may include any flat panel monitor or display. Display 1320 may include, for example, a computer display screen, touch screen display, video monitor, television-like device, and/or a television. Display 1320 may be digital and/or analog. In various implementations, display 1320 may be a holographic display. Also, display 1320 may be a transparent surface that may receive a visual projection. Such projections may convey various forms of information, images, and/or objects. For example, such projections may be a visual overlay for a mobile augmented reality (MAR) application. Under the control of one or more software applications 1316, platform 1302 may display user interface 1322 on display 1320.

In various implementations, content services device(s) 1330 may be hosted by any national, international and/or independent service and thus accessible to platform 1302 via the Internet, for example. Content services device(s) 1330 may be coupled to platform 1302 and/or to display 1320. Platform 1302 and/or content services device(s) 1330 may be coupled to a network 1360 to communicate (e.g., send and/or receive) media information to and from network 1360. Content delivery device(s) 1340 also may be coupled to platform 1302 and/or to display 1320.

In various implementations, content services device(s) 1330 may include a cable television box, personal computer, network, telephone, Internet enabled devices or appliance capable of delivering digital information and/or content, and any other similar device capable of uni-directionally or bi-directionally communicating content between content providers and platform 1302 and/display 1320, via network 1360 or directly. It will be appreciated that the content may be communicated uni-directionally and/or bi-directionally to and from any one of the components in system 1300 and a content provider via network 1360. Examples of content may include any media information including, for example, video, music, medical and gaming information, and so forth.

Content services device(s) 1330 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1302 may receive control signals from navigation controller 1350 having one or more navigation features. The navigation features of navigation controller 1350 may be used to interact with user interface 1322, for example. In various embodiments, navigation controller 1350 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1350 may be replicated on a display (e.g., display 1320) by movements of a pointer, cursor, focus ring, or other visual indicators displayed on the display. For example, under the control of software applications 1316, the navigation features located on navigation controller 1350 may be mapped to virtual navigation features displayed on user interface 1322, for example. In various embodiments, navigation controller 1350 may not be a separate component but may be integrated into platform 1302 and/or display 1320. The present disclosure, however, is not limited to the elements or in the context shown or described herein.

In various implementations, drivers (not shown) may include technology to enable users to instantly turn on and off platform 1302 like a television with the touch of a button after initial boot-up, when enabled, for example. Program logic may allow platform 1302 to stream content to media adaptors or other content services device(s) 1330 or content delivery device(s) 1340 even when the platform is turned "off." In addition, chipset 1305 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1300 may be integrated. For example, platform 1302 and content services device(s) 1330 may be integrated, or platform 1302 and content delivery device(s) 1340 may be integrated, or platform 1302, content services device(s) 1330, and content delivery device(s) 1340 may be integrated, for example. In various embodiments, platform 1302 and display 1320 may be an integrated unit. Display 1320 and content service device(s) 1330 may be integrated, or display 1320 and content delivery device(s) 1340 may be integrated, for example. These examples are not meant to limit the present disclosure.

In various embodiments, system 1300 may be implemented as a wireless system, a wired system, or a combination of both. When implemented as a wireless system, system 1300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 13.

Figure 14:
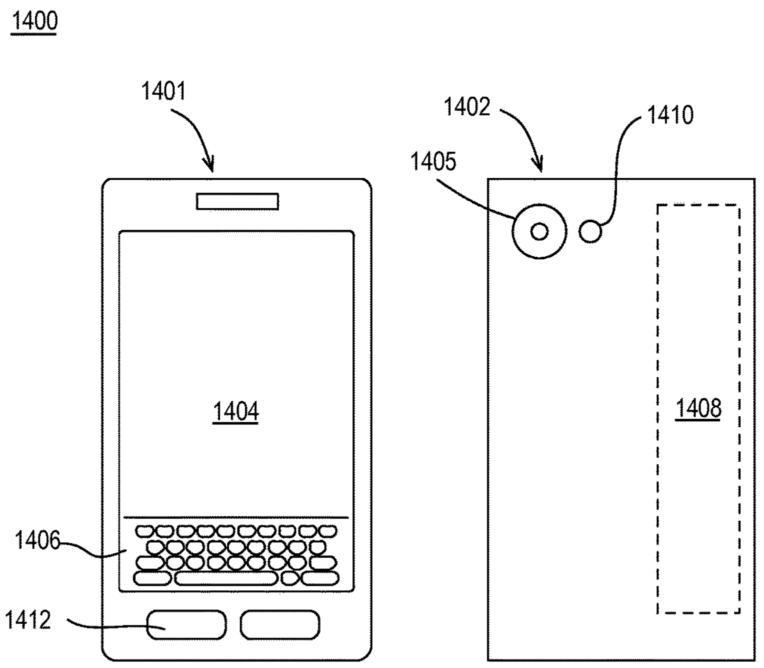
FIG. 14 illustrates an example small form factor device, all arranged in accordance with at least some implementations of the present disclosure.

As described above, system 1300 may be embodied in varying physical styles or form factors. FIG. 14 illustrates an example small form factor device 1400, arranged in accordance with at least some implementations of the present disclosure. In some examples, system 1300 may be implemented via device 1400. In other examples, device 100, device 700, device 800, system 1300, or system 1300, or portions thereof may be implemented via device 1400. In various embodiments, for example, device 1400 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using, other wireless mobile computing devices as well. The embodiments are not limited in this context.

As shown in FIG. 14, device 1400 may include a housing with a front 1401 and a back 1402. Device 1400 includes a display 1404, an input/output (I/O) device 1406, and an integrated antenna 1408. Device 1400 also may include navigation features 1412. I/O device 1406 may include any suitable I/O device for entering information into a mobile computing device. Examples for I/O device 1406 may include an alphanumeric keyboard, a numeric keypad, a touch pad, input keys, buttons, switches, microphones, speakers, voice recognition device and software, and so forth. Information also may be entered into device 1400 by way of microphone (not shown), or may be digitized by a voice recognition device. As shown, device 1400 may include a camera 1405 (e.g., including a lens, an aperture, and an imaging sensor) and a flash 1410 integrated into back 1402 (or elsewhere) of device 1400. In other examples, camera 1405 and flash 1410 may be integrated into front 1401 of device 1400 or both front and back cameras may be provided. Camera 1405 and flash 1410 may be components of a camera module to originate image data processed into streaming video that is output to display 1404 and/or communicated remotely from device 1400 via antenna 1408 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating, system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one or more first embodiments, a method for performing color conversion comprises determining an array of ordered coefficients based on input color channel values associated with a pixel of an input image, wherein the array of ordered coefficients are associated with a subsection within a section of a color conversion space, generating offset values based on the input color channel values and the section of the color conversion space, and generating a converted color value for an output color channel for the pixel based on the array of ordered coefficients and the offset values.

Further to the first embodiments, determining the array of ordered coefficients comprises accessing a look up table based at least in part on the input color channel values.

Further to the first embodiments, determining the array of ordered coefficients comprises accessing a look up table based at least in part on the input color channel values and the method further comprises determining the subsection from a plurality of candidate subsections prior to accessing the look up table, wherein the candidate subsections comprise the section of the color conversion space, and wherein the look up table is indexed based at least in part on the subsection.

Further to the first embodiments, determining the array of ordered coefficients comprises accessing a look up table based at least in part on the input color channel values and/or the method further comprises determining the subsection from a plurality of candidate subsections prior to accessing the look up table, wherein the candidate subsections comprise the section of the color conversion space, and wherein the look up table is indexed based at least in part on the subsection.

Further to the first embodiments, the offset values comprise an offset value for each input color channel as a difference between the input color channel values and origin values of the section of the color conversion space.

Further to the first embodiments, wherein generating the converted color value comprises determining a dot product of the offset values and the array of ordered coefficients.

Further to the first embodiments, wherein generating the converted color value comprises determining a dot product of the offset values and the array of ordered coefficients and determining the dot product comprises a single instruction multiple data operation.

Further to the first embodiments, generating the converted color value comprises determining a dot product of the offset values and the array of ordered coefficients, and/or wherein determining the dot product comprises a single instruction multiple data operation.

Further to the first embodiments, the section comprises a cube and the subsection comprises at least one of a tetrahedron, a prism, or a pyramid.

Further to the first embodiments, the array of ordered coefficients comprises four elements, the offset values comprise three values, and generating the converted color value comprises a dot product of the four array of ordered coefficients with the three offset values and a constant.

Further to the first embodiments, the method further comprises determining a second array of ordered coefficients based on the input color channel values and generating a second converted color value for a second output color channel for the pixel based on the second array of ordered coefficients and the offset values.

Further to the first embodiments, the method further comprises determining a second array of ordered coefficients based on the input color channel values and generating a second converted color value for a second output color channel for the pixel based on the second array of ordered coefficients and the offset values, wherein the array of ordered coefficients and the second array of ordered coefficients are determined via a single access to a look tip table.

Further to the first embodiments, the method further comprises determining a second array of ordered coefficients based on the input color channel values and generating a second converted color value for a second output color channel for the pixel based on the second array of ordered coefficients and the offset values, and/or wherein the array of ordered coefficients and the second array of ordered coefficients are determined via to single access to a look up table.

Further to the first embodiments, determining the array of ordered coefficients comprises accessing a look up table based at least in part on the input color channel values and the method further comprises generating the look up table based at least in part on determining vertex values associated with the section, defining a plurality of converted color value functions each associated with one of a plurality of subsections of the section, reducing the converted color value functions to linear functions based on position offsets within the subsections, and providing arrays of ordered coefficients for the subsections as linear coefficients of the linear functions.

In one or more second embodiments, a system for performing color conversion comprises a memory configured to receive an input image and a graphics processing unit coupled to the memory, the graphics processing unit to receive an array of ordered coefficients based on input color channel values associated with a pixel of the input image, wherein the array of ordered coefficients are associated with a subsection within a section of a color conversion space and generate a converted color value for an output color channel for the pixel based on the array of ordered coefficients and offset values associated with the input color channel values and the section of the color conversion space.

Further to the second embodiments, the memory is to store a look up table comprising the array of ordered coefficients and the graphics processing unit to receive the array of ordered coefficients comprises the graphics processing unit to receive the array of ordered coefficients from the look up table.

Further to the second embodiments, the memory is to store a look up table comprising the way of ordered coefficients and the graphics processing unit to receive the array of ordered coefficients comprises the graphics processing unit to receive the array of ordered coefficients from the look up table and the system further comprises subsection determination logic to determine the subsection from a plurality of candidate subsections, wherein the candidate subsections comprise the section of the color conversion space, and wherein the look up table is indexed based at least in part on the subsection.

Further to the second embodiments, the memory is to store a look up table comprising the array of ordered coefficients and the graphics processing unit to receive the array of ordered coefficients comprises the graphics processing unit to receive the array of ordered coefficients from the look up table and/or wherein the system further comprises subsection determination logic to determine the subsection from a plurality of candidate subsections, wherein the candidate subsections comprise the section of the color conversion space, and wherein the look up table is indexed based at least in part on the subsection.

Further to the second embodiments, the offset values comprise an offset value for each input color channel as a difference between the input color channel values and origin values of the section of the color conversion space.

Further to the second embodiments, the graphics processing unit to generate the converted color value comprises the graphics processing unit to determine a dot product of the offset values and the array of ordered coefficients.

Further to the second embodiments, the graphics processing unit to generate the converted color value comprises the graphics processing unit to determine a dot product of the offset values and the array of ordered coefficients and/or the graphics processing unit to determine the dot product comprises the graphics processing unit to implement a single instruction multiple data operation.

Further to the second embodiments, the graphics processing unit to generate the converted color value comprises the graphics processing unit to determine a dot product of the offset values and the array of ordered coefficients and/or the graphics processing unit to determine the dot product comprises the graphics processing unit to implement a single instruction multiple data operation, wherein the graphics processing unit to determine the dot product comprises the graphics processing unit to implement a single instruction multiple data operation.

Further to the second embodiments, the section comprises a cube and the subsection comprises at least one of a tetrahedron, a prism, or a pyramid.

Further to the second embodiments, the array of ordered coefficients comprises four elements, the offset values comprise three values, and the graphics processing unit to generate the converted color value comprises the graphics processing unit to determine a dot product of the four array of ordered coefficients with the three offset values and a constant.

Further to the second embodiments, the memory is to store a look up table comprising the array of ordered coefficients and the graphics processing unit to receive the array of ordered coefficients and a second array of ordered coefficients via a single access to the look up table, the graphics processing unit to generate a second converted color value for a second output color channel for the pixel based on the second array of ordered coefficients and the offset values.

In one or more third embodiments, a system for performing color conversion comprises means for determining an array of ordered coefficients based on input color channel values associated with a pixel of an input image, wherein the array of ordered coefficients are associated with a subsection within a section of a color conversion space, means for generating offset values based on the input color channel values and the section of the color conversion space, and means for generating a converted color value for an output color channel for the pixel based on the array of ordered coefficients and the offset values.

Further to the third embodiments, the means for determining the array of ordered coefficients comprises means for accessing a look up table based at least in pan on the input color channel values.

Further to the third embodiments, the means for determining the array of ordered coefficients comprises means for accessing a look up table based at least in part on the input color channel values and the system further comprises means for determining the subsection from a plurality of candidate subsections prior to accessing the look up table, wherein the candidate subsections comprise the section of the color conversion space, and wherein the look up table is indexed based at least in part on the subsection.

Further to the third embodiments, the offset values comprise an offset value for each input color channel as a difference between the input color channel values and origin values of the section of the color conversion space.

Further to the third embodiments, the means for generating the converted color value composes means for determining a dot product of the offset values and the array of ordered coefficients.

Further to the third embodiments, the means for generating the converted color value comprises means for determining a dot product of the offset values and the array of ordered coefficients and the means for determining the dot product comprises means for as single instruction multiple data operation.

Further to the third embodiments, the section comprises a cube and the subsection comprises at least one of a tetrahedron, a prism, or a pyramid.

Further to the third embodiments, the array of ordered coefficients comprises four elements, the offset values comprise three values, and the means for generating the converted color value comprises means for performing a dot product, of the four array of ordered coefficients with the three offset values and a constant.

Further to the third embodiments, the system further comprises means for determining a second array of ordered coefficients based on the input color channel values and means for generating a second converted color value for a second output color channel for the pixel based on the second array of ordered coefficients and the offset values.

Further to the third embodiments, the system further comprises means for determining a second array of ordered coefficients based on the input color channel values and means for generating a second converted color value for a second output color channel for the pixel based on the second array of ordered coefficients and the offset values, wherein the array of ordered coefficients and the second array of ordered coefficients are determined via a single access to a look up table.

Further to the third embodiments, the means for determining the array of ordered coefficients comprises means for accessing a look up table based at least in pan on the input color channel values and the system further comprises means for generating the look up table based at least in part on determining vertex values associated with the section, means for defining a plurality of converted color value functions each associated with one of a plurality of subsections of the section, means for reducing the converted color value functions to linear functions based on position offsets within the subsections, and means for providing arrays of ordered coefficients for the subsections as linear coefficients of the linear functions.

In one or more fourth embodiments, at least one machine readable medium comprises a plurality of instructions that, in response to being executed on a device, cause the device to perform color conversion by determining an array of ordered coefficients based on input color channel values associated with a pixel of an input image, wherein the array of ordered coefficients are associated with a subsection within a section of a color conversion space, generating offset values based on the input color channel values and the section of the color conversion space, and generating a converted color value for an output color channel for the pixel based on the array of ordered coefficients and the offset values.

Further to the fourth embodiments, determining the array of ordered coefficients comprises accessing a look up table based at least in part on the input color channel values.

Further to the fourth embodiments, determining the array of ordered coefficients comprises accessing a look up table based at least in part on the input color channel values and the machine readable medium comprises further instructions that, in response to being executed on the device, cause the device to perform color conversion by determining the subsection from a plurality of candidate subsections prior to accessing the look up table, wherein the candidate subsections comprise the section of the color conversion space, and wherein the look up table is indexed based at least in part on the subsection.

Further to the fourth embodiments, generating the converted color value comprises determining a dot product of the offset values and the array of ordered coefficients.

Further to the fourth embodiments, generating the converted color value comprises determining a dot product of the offset values and the array of ordered coefficients and determining the dot product comprises a single instruction multiple data operation.

Further to the fourth embodiments, the section comprises a cube and the subsection comprises at least one of a tetrahedron, a prism, or a pyramid.

Further to the fourth embodiments, the machine readable medium comprises further instructions that, in response to being executed on the device, cause the device to perform color conversion by determining a second array of ordered coefficients based on the input color channel values and generating a second convened color value for a second output color channel for the pixel based on the second array of ordered coefficients and the offset values, wherein the array of ordered coefficients and the second array of ordered coefficients are determined via a single access to a look up table.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A method for performing color conversion comprising:

determining, with a graphics processing unit, an array of ordered coefficients based on input color channel values associated with a pixel of an input image, wherein the array of ordered coefficients are associated with a subsection within a section of a color conversion space;

generating offset values based on the input color channel values and the section of the color conversion space; and generating a converted color value for an output color channel for the pixel based on the array of ordered coefficients and the offset values;

determining, with the graphics processing unit, a second array of ordered coefficients based on the input color channel values, wherein the array of ordered coefficients and the second array of ordered coefficients are determined via a single access to a look up table; and generating a color converted output image comprising the converted color value for the output color channel for the pixel.

2. The method of claim 1, wherein determining the array of ordered coefficients comprises accessing a look up table based at least in part on the input color channel values.

3. The method of claim 2, further comprising:

determining the subsection from a plurality of candidate subsections prior to accessing the look up table, wherein the candidate subsections comprise the section of the color conversion space, and wherein the look up table is indexed based at least in part on the subsection.

4. The method of claim 1, wherein the offset values comprise an offset value for each input color channel as a difference between the input color channel values and origin values of the section of the color conversion space.

5. The method of claim 1, wherein generating the converted color value comprises determining a dot product of the offset values and the array of ordered coefficients.

6. The method of claim 1, wherein the section comprises a cube and the subsection comprises at least one of a tetrahedron, a prism, or a pyramid.

7. The method of claim 1, wherein the array of ordered coefficients comprises four elements, the offset values comprise three values, and generating the converted color value comprises a dot product of the four array of ordered coefficients with the three offset values and a constant.

8. The method of claim 1, further comprising:

generating a second converted color value for a second output color channel for the pixel based on the second array of ordered coefficients and the offset values.

9. The method of claim 1, wherein determining the array of ordered coefficients comprises accessing a look up table based at least in part on the input color channel values, the method further comprising:

generating the look up table based at least in part on determining vertex values associated with the section, defining a plurality of converted color value functions each associated with one of a plurality of subsections of the section, reducing the converted color value functions to linear functions based on position offsets within the subsections, and providing arrays of ordered coefficients for the subsections as linear coefficients of the linear functions.

10. A system for performing color conversion comprising:

a memory configured to receive an input image; and a graphics processing unit coupled to the memory, the graphics processing unit to receive an array of ordered coefficients based on input color channel values associated with a pixel of the input image, wherein the array of ordered coefficients are associated with a subsection within a section of a color conversion space; generate offset values based on the input color channel values and the section of the color conversion space; generate a converted color value for an output color channel for the pixel based on the array of ordered coefficients and offset values associated with the input color channel values and the section of the color conversion space; receive a second array of ordered coefficients based on the input color channel values, wherein the array of ordered coefficients and the second array of ordered coefficients are determined via a single access to a look up table; and generate a color converted output image comprising the converted color value for the output color channel for the pixel.

11. The system of claim 10, wherein the memory is to store a look up table comprising the array of ordered coefficients and the graphics processing unit to receive the array of ordered coefficients comprises the graphics processing unit to receive the array of ordered coefficients from the look up table.

12. The system of claim 11, further comprising:

subsection determination logic to determine the subsection from a plurality of candidate subsections, wherein the candidate subsections comprise the section of the color conversion space, and wherein the look up table is indexed based at least in part on the subsection.

13. The system of claim 10, wherein the graphics processing unit to generate the converted color value comprises the graphics processing unit to determine a dot product of the offset values and the array of ordered coefficients.

14. The system of claim 13, wherein the graphics processing unit to determine the dot product comprises the graphics processing unit to implement a single instruction multiple data operation.

15. The system of claim 10, wherein the section comprises a cube and the subsection comprises at least one of a tetrahedron, a prism, or a pyramid.

16. The system of claim 10, wherein the memory is to store a look up table comprising the array of ordered coefficients and the graphics processing unit to receive the array of ordered coefficients and a second array of ordered coefficients via a single access to the look up table, the graphics processing unit to generate a second converted color value for a second output color channel for the pixel based on the second array of ordered coefficients and the offset values.

17. At least one non-transitory machine readable medium comprising a plurality of instructions that, in response to being executed on a device, cause the device to perform color conversion by:

determining, with a graphics processing unit, an array of ordered coefficients based on input color channel values associated with a pixel of an input image, wherein the array of ordered coefficients are associated with a subsection within a section of a color conversion space;

generating offset values based on the input color channel values and the section of the color conversion space; and generating a converted color value for an output color channel for the pixel based on the array of ordered coefficients and the offset values;

determining a second array of ordered coefficients based on the input color channel values, wherein the array of ordered coefficients and the second array of ordered coefficients are determined via a single access to a look up table; and generating a color converted output image comprising the converted color value for the output color channel for the pixel.

18. The machine readable medium of claim 17, wherein determining the array of ordered coefficients comprises accessing a look up table based at least in part on the input color channel values.

19. The machine readable medium of claim 18, the machine readable medium comprising further instructions that, in response to being executed on the device, cause the device to perform color conversion by:

determining the subsection from a plurality of candidate subsections prior to accessing the look up table, wherein the candidate subsections comprise the section of the color conversion space, and wherein the look up table is indexed based at least in part on the subsection.

20. The machine readable medium of claim 17, wherein generating the converted color value comprises determining a dot product of the offset values and the array of ordered coefficients.

21. The machine readable medium of claim 20, wherein determining the dot product comprises a single instruction multiple data operation.

22. The machine readable medium of claim 17, wherein the section comprises a cube and the subsection comprises at least one of a tetrahedron, a prism, or a pyramid.

23. The machine readable medium of claim 17, the machine readable medium comprising further instructions that, in response to being executed on the device, cause the device to perform color conversion by:

determining a second array of ordered coefficients based on the input color channel values; and generating a second converted color value for a second output color channel for the pixel based on the second array of ordered coefficients and the offset values, wherein the array of ordered coefficients and the second array of ordered coefficients are determined via a single access to a look up table.

* * * * *